United States Patent
Dayal et al.

(10) Patent No.: US 10,012,505 B2
(45) Date of Patent: Jul. 3, 2018

(54) WEARABLE SYSTEM FOR PROVIDING WALKING DIRECTIONS

(71) Applicant: Toyota Motor Engineering & Manufacturing North America, Inc., Erlanger, KY (US)

(72) Inventors: Rajiv Dayal, Milpitas, CA (US); Tiffany L. Chen, San Jose, CA (US); Patrick K. Ching, San Jose, CA (US); Brandon D. Northcutt, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 77 days.

(21) Appl. No.: 15/349,935

(22) Filed: Nov. 11, 2016

(65) Prior Publication Data

US 2018/0135986 A1 May 17, 2018

(51) Int. Cl.
*G01C 21/00* (2006.01)
*G01C 21/16* (2006.01)
(Continued)

(52) U.S. Cl.
CPC .......... *G01C 21/165* (2013.01); *G01C 21/00* (2013.01); *G01C 21/265* (2013.01);
(Continued)

(58) Field of Classification Search
CPC ......... G01C 21/00; G06F 17/30; G06F 19/00; G06K 9/18; G06K 9/62
(Continued)

(56) References Cited

U.S. PATENT DOCUMENTS

| 4,520,501 A | 5/1985 | DuBrucq |
| 4,586,827 A | 5/1986 | Hirsch et al. |

(Continued)

FOREIGN PATENT DOCUMENTS

| CN | 201260746 | 6/2009 |
| CN | 101527093 | 9/2009 |

(Continued)

OTHER PUBLICATIONS

AlZuhair et al.; "*NFC Based Applications for Visually Impaired People—A Review*"; IEEE International Conference on Multimedia and Expo Workshops (ICMEW), Jul. 14, 2014; 7 pages.

(Continued)

*Primary Examiner* — Thomas G Black
*Assistant Examiner* — Wae L Louie
(74) *Attorney, Agent, or Firm* — Snell & Wilmer LLP

(57) ABSTRACT

A wearable computing device includes an input device, a global positioning system (GPS) sensor, an inertial measurement unit (IMU), a camera, and a memory that is designed to store a database of landmarks and corresponding locations. The device includes a mobile processor that is designed to receive first user input indicating that the user is traveling from a starting location to a destination location and second user input indicating that new landmarks are present. The processor is designed to determine locations of the new landmarks based on the current location, the inertial measurement data, and/or the detected image data. The processor is designed to update the database to include the new landmarks and corresponding locations. The processor is designed to update the database to include an ordered list of landmarks including the new landmarks in order of their appearance from the starting location to the destination location.

20 Claims, 9 Drawing Sheets

(51) Int. Cl.
*G01S 19/47* (2010.01)
*G01C 21/36* (2006.01)
*G01C 21/26* (2006.01)
*G06Q 30/06* (2012.01)
*G06F 17/30* (2006.01)
*G06K 9/62* (2006.01)
*G06K 9/18* (2006.01)

(52) U.S. Cl.
CPC .......... *G01C 21/3605* (2013.01); *G01S 19/47* (2013.01); *G06F 17/30* (2013.01); *G06K 9/18* (2013.01); *G06K 9/62* (2013.01); *G06Q 30/0639* (2013.01)

(58) Field of Classification Search
USPC ........................................................ 701/408
See application file for complete search history.

(56) References Cited

U.S. PATENT DOCUMENTS

| | | |
|---|---|---|
| 4,786,966 A | 11/1988 | Hanson |
| 5,047,952 A | 9/1991 | Kramer |
| 5,097,856 A | 3/1992 | Chi-Sheng |
| 5,129,716 A | 7/1992 | Holakovszky et al. |
| 5,233,520 A | 8/1993 | Kretsch et al. |
| 5,265,272 A | 11/1993 | Kurcbart |
| 5,463,428 A | 10/1995 | Lipton et al. |
| 5,508,699 A | 4/1996 | Silverman |
| 5,539,665 A | 7/1996 | Lamming et al. |
| 5,543,802 A | 8/1996 | Villevieille et al. |
| 5,544,050 A | 8/1996 | Abe |
| 5,568,127 A | 10/1996 | Bang |
| 5,636,038 A | 6/1997 | Lynt |
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,055,048 A | 4/2000 | Langevin et al. |
| 6,067,112 A | 5/2000 | Wellner et al. |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 | 2/2002 | Spitzer |
| 6,466,232 B1 | 10/2002 | Newell et al. |
| 6,477,239 B1 | 11/2002 | Ohki |
| 6,542,623 B1 | 4/2003 | Kahn |
| 6,580,999 B2 | 6/2003 | Maruyama et al. |
| 6,594,370 B1 | 7/2003 | Anderson |
| 6,603,863 B1 | 8/2003 | Nagayoshi |
| 6,619,836 B1 | 9/2003 | Silvant et al. |
| 6,701,296 B1 | 3/2004 | Kramer |
| 6,774,788 B1 | 8/2004 | Balfe |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,413,554 B2 | 8/2008 | Kobayashi et al. |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini et al. |
| 7,501,958 B2 | 3/2009 | Saltzstein et al. |
| 7,525,568 B2 | 4/2009 | Raghunath |
| 7,564,469 B2 | 7/2009 | Cohen |
| 7,565,295 B1 | 7/2009 | Hernandez-Rebollar |
| 7,598,976 B2 | 10/2009 | Sofer et al. |
| 7,618,260 B2 | 11/2009 | Daniel et al. |
| D609,818 S | 2/2010 | Tsang et al. |
| 7,656,290 B2 | 2/2010 | Fein et al. |
| 7,659,915 B2 | 2/2010 | Kurzweil et al. |
| 7,743,996 B2 | 6/2010 | Maciver |
| D625,427 S | 10/2010 | Lee |
| 7,843,351 B2 | 11/2010 | Bourne |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,359,122 B2 | 1/2013 | Koselka et al. |
| 8,395,968 B2 | 3/2013 | Vartanian et al. |
| 8,400,155 B2 * | 3/2013 | Nielsen .................... G01V 3/15 324/329 |
| 8,401,785 B2 | 3/2013 | Cho et al. |
| 8,414,246 B2 | 4/2013 | Tobey |
| 8,418,705 B2 | 4/2013 | Ota et al. |
| 8,428,643 B2 | 4/2013 | Lin |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 | 11/2013 | Albertson et al. |
| 8,588,972 B2 | 11/2013 | Fung |
| 8,591,412 B2 | 11/2013 | Kovarik et al. |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,718,672 B2 | 5/2014 | Xie et al. |
| 8,743,145 B1 | 6/2014 | Price |
| 8,750,898 B2 | 6/2014 | Haney |
| 8,768,071 B2 | 7/2014 | Tsuchinaga et al. |
| 8,786,680 B2 | 7/2014 | Shiratori et al. |
| 8,797,141 B2 | 8/2014 | Best et al. |
| 8,797,386 B2 | 8/2014 | Chou et al. |
| 8,803,699 B2 | 8/2014 | Foshee et al. |
| 8,805,929 B2 | 8/2014 | Erol et al. |
| 8,812,244 B2 | 8/2014 | Angelides |
| 8,814,019 B2 | 8/2014 | Dyster et al. |
| 8,825,398 B2 | 9/2014 | Alexandre et al. |
| 8,836,532 B2 | 9/2014 | Fish, Jr. et al. |
| 8,836,580 B2 | 9/2014 | Mendelson |
| 8,836,910 B2 | 9/2014 | Cashin et al. |

(56) References Cited

U.S. PATENT DOCUMENTS

| | | |
|---|---|---|
| 8,902,303 B2 | 12/2014 | Na'Aman et al. |
| 8,909,534 B1 | 12/2014 | Heath |
| D721,673 S | 1/2015 | Park et al. |
| 8,926,330 B2 | 1/2015 | Taghavi |
| 8,930,458 B2 | 1/2015 | Lewis |
| 8,981,682 B2 | 3/2015 | Delson et al. |
| 8,994,498 B2 | 3/2015 | Agrafioti |
| D727,194 S | 4/2015 | Wilson |
| 9,004,330 B2 | 4/2015 | White |
| 9,025,016 B2 | 5/2015 | Wexler et al. |
| 9,042,596 B2 | 5/2015 | Connor |
| 9,053,094 B2 | 6/2015 | Yassa |
| 9,076,450 B1 | 7/2015 | Sadek |
| 9,081,079 B2 | 7/2015 | Chao et al. |
| 9,081,385 B1 | 7/2015 | Ferguson et al. |
| D736,741 S | 8/2015 | Katz |
| 9,111,545 B2 | 8/2015 | Jadhav et al. |
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,185,489 B2 | 11/2015 | Gerber et al. |
| 9,190,058 B2 | 11/2015 | Klein |
| 9,104,806 B2 | 12/2015 | Stivoric et al. |
| 9,230,430 B2 | 1/2016 | Civelli et al. |
| 9,232,366 B1 | 1/2016 | Charlier et al. |
| 9,267,801 B2 | 2/2016 | Gupta et al. |
| 9,269,015 B2 | 2/2016 | Boncyk et al. |
| 9,275,376 B2 | 3/2016 | Barraclough et al. |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0173346 A1 | 11/2002 | Wang |
| 2002/0178344 A1 | 11/2002 | Bourget |
| 2003/0026461 A1 | 2/2003 | Arthur Hunter |
| 2003/0133008 A1 | 7/2003 | Stephenson |
| 2003/0133085 A1 | 7/2003 | Tretiakoff et al. |
| 2003/0179133 A1 | 9/2003 | Pepin et al. |
| 2004/0056907 A1 | 3/2004 | Sharma |
| 2004/0232179 A1 | 11/2004 | Chauhan |
| 2004/0267442 A1 | 12/2004 | Fehr et al. |
| 2005/0208457 A1 | 9/2005 | Fink et al. |
| 2005/0221260 A1 | 10/2005 | Kikuchi |
| 2005/0259035 A1 | 11/2005 | Iwaki |
| 2005/0283752 A1 | 12/2005 | Fruchter |
| 2006/0004512 A1 | 1/2006 | Herbst et al. |
| 2006/0022048 A1* | 2/2006 | Johnson ............ G06F 17/3087 |
| | | 235/462.1 |
| 2006/0028550 A1 | 2/2006 | Palmer et al. |
| 2006/0029256 A1 | 2/2006 | Miyoshi et al. |
| 2006/0129308 A1 | 6/2006 | Kates |
| 2006/0171704 A1 | 8/2006 | Bingle et al. |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0182812 A1 | 8/2007 | Ritchey |
| 2007/0202865 A1 | 8/2007 | Moride |
| 2007/0230786 A1 | 10/2007 | Foss |
| 2007/0296572 A1 | 12/2007 | Fein et al. |
| 2008/0024594 A1 | 1/2008 | Ritchey |
| 2008/0068559 A1 | 3/2008 | Howell et al. |
| 2008/0120029 A1 | 5/2008 | Zelek et al. |
| 2008/0144854 A1 | 6/2008 | Abreu |
| 2008/0145822 A1 | 6/2008 | Bucchieri |
| 2008/0174676 A1 | 7/2008 | Squilla et al. |
| 2008/0198222 A1 | 8/2008 | Gowda |
| 2008/0198324 A1 | 8/2008 | Fuziak |
| 2008/0208455 A1 | 8/2008 | Hartman |
| 2008/0251110 A1 | 10/2008 | Pede |
| 2008/0260210 A1 | 10/2008 | Kobeli |
| 2008/0318636 A1 | 12/2008 | Kim |
| 2009/0012788 A1 | 1/2009 | Gilbert et al. |
| 2009/0040215 A1 | 2/2009 | Afzulpurkar et al. |
| 2009/0058611 A1 | 3/2009 | Kawamura |
| 2009/0106016 A1 | 4/2009 | Athsani |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2009/0210596 A1 | 8/2009 | Furuya |
| 2010/0030578 A1* | 2/2010 | Siddique ............ G06Q 10/0637 |
| | | 705/3 |
| 2010/0041378 A1 | 2/2010 | Aceves et al. |
| 2010/0069035 A1* | 3/2010 | Johnson ............ H04W 4/02 |
| | | 455/404.1 |
| 2010/0080418 A1 | 4/2010 | Ito |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar et al. |
| 2010/0198494 A1 | 8/2010 | Chao et al. |
| 2010/0199232 A1 | 8/2010 | Mistry et al. |
| 2010/0241350 A1 | 9/2010 | Cioffi et al. |
| 2010/0245585 A1 | 9/2010 | Fisher et al. |
| 2010/0267276 A1 | 10/2010 | Wu et al. |
| 2010/0292917 A1 | 11/2010 | Emam et al. |
| 2010/0298976 A1 | 11/2010 | Sugihara et al. |
| 2010/0305845 A1 | 12/2010 | Alexandre et al. |
| 2010/0308999 A1 | 12/2010 | Chornenky |
| 2011/0066383 A1 | 3/2011 | Jangle et al. |
| 2011/0071830 A1 | 3/2011 | Kim |
| 2011/0092249 A1 | 4/2011 | Evanitsky |
| 2011/0124383 A1 | 5/2011 | Garra et al. |
| 2011/0125735 A1 | 5/2011 | Petrou |
| 2011/0181422 A1 | 7/2011 | Tran |
| 2011/0187640 A1 | 8/2011 | Jacobsen et al. |
| 2011/0211760 A1 | 9/2011 | Boncyk et al. |
| 2011/0216006 A1 | 9/2011 | Litschel |
| 2011/0221670 A1 | 9/2011 | King, III et al. |
| 2011/0234584 A1 | 9/2011 | Endo |
| 2011/0246064 A1 | 10/2011 | Nicholson |
| 2011/0260681 A1 | 10/2011 | Guccione et al. |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0082962 A1 | 4/2012 | Schmidt |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee et al. |
| 2012/0220234 A1 | 8/2012 | Abreu |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1 | 12/2012 | Mutoh |

(56) References Cited

U.S. PATENT DOCUMENTS

| | | |
|---|---|---|
| 2012/0327194 A1 | 12/2012 | Shiratori |
| 2013/0002452 A1 | 1/2013 | Lauren |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav et al. |
| 2013/0090133 A1 | 4/2013 | D'Jesus Bencci |
| 2013/0115578 A1 | 5/2013 | Shiina |
| 2013/0115579 A1 | 5/2013 | Taghavi |
| 2013/0116559 A1 | 5/2013 | Levin et al. |
| 2013/0127980 A1 | 5/2013 | Haddick et al. |
| 2013/0128051 A1 | 5/2013 | Velipasalar et al. |
| 2013/0131985 A1 | 5/2013 | Weiland et al. |
| 2013/0141576 A1 | 6/2013 | Lord et al. |
| 2013/0144629 A1 | 6/2013 | Johnston |
| 2013/0155474 A1 | 6/2013 | Roach et al. |
| 2013/0157230 A1 | 6/2013 | Morgan |
| 2013/0184982 A1 | 7/2013 | DeLuca et al. |
| 2013/0201344 A1 | 8/2013 | Sweet, III |
| 2013/0202274 A1 | 8/2013 | Chan |
| 2013/0204605 A1 | 8/2013 | Illgner-Fehns |
| 2013/0211718 A1 | 8/2013 | Yoo et al. |
| 2013/0218456 A1 | 8/2013 | Zelek et al. |
| 2013/0228615 A1 | 9/2013 | Gates et al. |
| 2013/0229669 A1 | 9/2013 | Smits |
| 2013/0243250 A1 | 9/2013 | France |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0265450 A1 | 10/2013 | Barnes, Jr. |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0326407 A1* | 12/2013 | van Os ................. G01C 21/00 715/810 |
| 2013/0328683 A1 | 12/2013 | Sitbon et al. |
| 2013/0332452 A1 | 12/2013 | Jarvis |
| 2014/0009561 A1 | 1/2014 | Sutherland et al. |
| 2014/0031081 A1 | 1/2014 | Vossoughi et al. |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0055353 A1 | 2/2014 | Takahama |
| 2014/0071234 A1 | 3/2014 | Millett |
| 2014/0081631 A1 | 3/2014 | Zhu et al. |
| 2014/0085446 A1 | 3/2014 | Hicks |
| 2014/0098018 A1 | 4/2014 | Kim et al. |
| 2014/0100773 A1 | 4/2014 | Cunningham et al. |
| 2014/0125700 A1 | 5/2014 | Ramachandran et al. |
| 2014/0132388 A1 | 5/2014 | Alalawi |
| 2014/0133290 A1 | 5/2014 | Yokoo et al. |
| 2014/0160250 A1 | 6/2014 | Pomerantz |
| 2014/0184384 A1 | 7/2014 | Zhu et al. |
| 2014/0184775 A1 | 7/2014 | Drake |
| 2014/0204245 A1 | 7/2014 | Wexler |
| 2014/0222023 A1 | 8/2014 | Kim et al. |
| 2014/0233859 A1 | 8/2014 | Cho |
| 2014/0236932 A1 | 8/2014 | Ikonomov |
| 2014/0249847 A1 | 9/2014 | Soon-Shiong |
| 2014/0251396 A1 | 9/2014 | Subhashrao et al. |
| 2014/0253702 A1 | 9/2014 | Wexler et al. |
| 2014/0278070 A1 | 9/2014 | McGavran et al. |
| 2014/0281943 A1 | 9/2014 | Prilepov et al. |
| 2014/0287382 A1 | 9/2014 | Villar Cloquell |
| 2014/0309806 A1 | 10/2014 | Ricci |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen et al. |
| 2014/0369541 A1 | 12/2014 | Miskin et al. |
| 2014/0379251 A1 | 12/2014 | Tolstedt |
| 2014/0379336 A1 | 12/2014 | Bhatnager |
| 2015/0002808 A1 | 1/2015 | Rizzo, III et al. |
| 2015/0016035 A1 | 1/2015 | Tussy |
| 2015/0058237 A1 | 2/2015 | Bailey |
| 2015/0063661 A1 | 3/2015 | Lee et al. |
| 2015/0081884 A1 | 3/2015 | Maguire et al. |
| 2015/0099946 A1 | 4/2015 | Sahin |
| 2015/0109107 A1 | 4/2015 | Gomez et al. |
| 2015/0120186 A1 | 4/2015 | Heikes et al. |
| 2015/0125831 A1 | 5/2015 | Chandrashekhar Nair et al. |
| 2015/0135310 A1 | 5/2015 | Lee |
| 2015/0141085 A1 | 5/2015 | Nuovo et al. |
| 2015/0142891 A1 | 5/2015 | Haque et al. |
| 2015/0154643 A1 | 6/2015 | Artman et al. |
| 2015/0196101 A1 | 7/2015 | Dayal et al. |
| 2015/0198454 A1 | 7/2015 | Moore et al. |
| 2015/0198455 A1 | 7/2015 | Chen et al. |
| 2015/0199566 A1 | 7/2015 | Moore et al. |
| 2015/0201181 A1 | 7/2015 | Moore et al. |
| 2015/0211858 A1 | 7/2015 | Jerauld |
| 2015/0219757 A1 | 8/2015 | Boelter et al. |
| 2015/0223355 A1 | 8/2015 | Fleck et al. |
| 2015/0256977 A1 | 9/2015 | Huang |
| 2015/0257555 A1 | 9/2015 | Wong |
| 2015/0260474 A1 | 9/2015 | Rublowsky et al. |
| 2015/0262509 A1 | 9/2015 | Labbe |
| 2015/0279172 A1 | 10/2015 | Hyde |
| 2015/0324646 A1 | 11/2015 | Kimia |
| 2015/0330787 A1 | 11/2015 | Cioffi et al. |
| 2015/0336276 A1 | 11/2015 | Song et al. |
| 2015/0338917 A1 | 11/2015 | Steiner et al. |
| 2015/0341591 A1 | 11/2015 | Kelder et al. |
| 2015/0346496 A1 | 12/2015 | Haddick et al. |
| 2015/0356345 A1 | 12/2015 | Velozo |
| 2015/0356837 A1 | 12/2015 | Pajestka et al. |
| 2015/0364943 A1 | 12/2015 | Vick et al. |
| 2015/0367176 A1 | 12/2015 | Bejestan |
| 2015/0375395 A1 | 12/2015 | Kwon et al. |
| 2016/0007158 A1 | 1/2016 | Venkatraman |
| 2016/0028917 A1 | 1/2016 | Wexler |
| 2016/0042228 A1 | 2/2016 | Opalka |
| 2016/0078289 A1 | 3/2016 | Michel |
| 2016/0098138 A1 | 4/2016 | Park |
| 2016/0156850 A1 | 6/2016 | Werblin et al. |
| 2016/0198319 A1 | 7/2016 | Huang |
| 2016/0350514 A1 | 12/2016 | Rajendran |

FOREIGN PATENT DOCUMENTS

| | | |
|---|---|---|
| CN | 201440733 | 4/2010 |
| CN | 101803988 | 8/2010 |
| CN | 101647745 | 1/2011 |
| CN | 102316193 | 1/2012 |
| CN | 102631280 | 8/2012 |
| CN | 202547659 | 11/2012 |
| CN | 202722736 | 2/2013 |
| CN | 102323819 | 6/2013 |
| CN | 103445920 | 12/2013 |
| DE | 102011080056 | 1/2013 |
| DE | 102012000587 | 7/2013 |
| DE | 102012202614 | 8/2013 |
| EP | 1174049 | 9/2004 |
| EP | 1721237 | 11/2006 |
| EP | 2368455 | 9/2011 |
| EP | 2371339 | 10/2011 |
| EP | 2127033 | 8/2012 |
| EP | 2581856 | 4/2013 |
| EP | 2751775 | 7/2016 |
| FR | 2885251 | 11/2006 |
| GB | 2401752 | 11/2004 |
| JP | 1069539 | 3/1998 |
| JP | 2001304908 | 10/2001 |
| JP | 2010012529 | 1/2010 |
| JP | 2010182193 | 8/2010 |
| JP | 4727352 | 7/2011 |
| JP | 2013169611 | 9/2013 |
| KR | 100405636 | 11/2003 |
| KR | 20080080688 | 9/2008 |
| KR | 20120020212 | 3/2012 |

(56) References Cited

FOREIGN PATENT DOCUMENTS

| | | |
|---|---|---|
| KR | 1250929 | 4/2013 |
| WO | WO 1995/004440 | 2/1995 |
| WO | WO 9949656 | 9/1999 |
| WO | WO 0010073 | 2/2000 |
| WO | WO 0038393 | 6/2000 |
| WO | WO 0179956 | 10/2001 |
| WO | WO 2004/076974 | 9/2004 |
| WO | WO 2006/028354 | 3/2006 |
| WO | WO 2006/045819 | 5/2006 |
| WO | WO 2007/031782 | 3/2007 |
| WO | WO 2008/015375 | 2/2008 |
| WO | WO 2008/035993 | 3/2008 |
| WO | WO 2008/008791 | 4/2008 |
| WO | WO 2008/096134 | 8/2008 |
| WO | WO 2008/127316 | 10/2008 |
| WO | WO 2010/062481 | 6/2010 |
| WO | WO 2010/109313 | 9/2010 |
| WO | WO 2012/040703 | 3/2012 |
| WO | WO 2012/163675 | 12/2012 |
| WO | WO 2013/045557 | 4/2013 |
| WO | WO 2013/054257 | 4/2013 |
| WO | WO 2013/067539 | 5/2013 |
| WO | WO 2013/147704 | 10/2013 |
| WO | WO 2014/104531 | 7/2014 |
| WO | WO 2014/138123 | 9/2014 |
| WO | WO 2014/172378 | 10/2014 |
| WO | WO 2015/065418 | 5/2015 |
| WO | WO 2015/092533 | 6/2015 |
| WO | WO 2015/108882 | 7/2015 |
| WO | WO 2015/127062 | 8/2015 |

OTHER PUBLICATIONS

"Light Detector" *EveryWare Technologies*; 2 pages; Jun. 18, 2016.
Aggarwal et al.; "All-in-One Companion for Visually Impaired;" *International Journal of Computer Applications*; vol. 79. No. 14; pp. 37-40; Oct. 2013.
AppleVis; *An Introduction to Braille Screen Input on iOS 8*; http://www.applevis.com/guides/braille-ios/introduction-braille-screen-input-ios-8, Nov. 16, 2014; 7 pages.
Arati et al. "Object Recognition in Mobile Phone Application for Visually Impaired Users;" *IOSR Journal of Computer Engineering (IOSR-JCE)*; vol. 17, No. 1; pp. 30-33; Jan. 2015.
Bharathi et al.; "Effective Navigation for Visually Impaired by Wearable Obstacle Avoidance System;" *2012 International Conference on Computing, Electronics and Electrical Technologies (ICCEET)*; pp. 956-958; 2012.
Bhatlawande et al.; "*Way-finding Electronic Bracelet for Visually Impaired People*"; IEEE Point-of-Care Healthcare Technologies (PHT), Jan. 16-18, 2013; 4 pages.
Bigham et al.; "*VizWiz: Nearly Real-Time Answers to Visual Questions*" Proceedings of the 23nd annual ACM symposium on User interface software and technology; 2010; 2 pages.
Blaze Engineering; "*Visually Impaired Resource Guide: Assistive Technology for Students who use Braille*"; Braille 'n Speak Manual; http://www.blaize.com; Nov. 17, 2014; 5 pages.
Blenkhorn et al.; "*An Ultrasonic Mobility Device with Minimal Audio Feedback*"; Center on Disabilities Technology and Persons with Disabilities Conference; Nov. 22, 1997; 5 pages.
Borenstein et al.; "*The GuideCane—A Computerized Travel Aid for the Active Guidance of Blind Pedestrians*"; IEEE International Conference on Robotics and Automation; Apr. 21-27, 1997; 6 pages.
Bujacz et al.; "*Remote Guidance for the Blind—A Proposed Teleassistance System and Navigation Trials*"; Conference on Human System Interactions; May 25-27, 2008; 6 pages.
Burbey et al.; "*Human Information Processing with the Personal Memex*"; ISE 5604 Fall 2005; Dec. 6, 2005; 88 pages.
Campos et al.; "*Design and Evaluation of a Spoken-Feedback Keyboard*"; Department of Information Systems and Computer Science, INESC-ID/IST/Universidade Tecnica de Lisboa, Jul. 2004; 6 pages.

Caperna et al.; "*A Navigation and Object Location Device for the Blind*"; Tech. rep. University of Maryland College Park; May 2009; 129 pages.
Cardonha et al.; "*A Crowdsourcing Platform for the Construction of Accessibility Maps*"; W4A'13 Proceedings of the 10th International Cross-Disciplinary Conference on Web Accessibility; Article No. 26; 2013; 5 pages.
Chaudary et al.; "*Alternative Navigation Assistance Aids for Visually Impaired Blind Persons*"; Proceedings of ICEAPVI; Feb. 12-14 2015; 5 pages.
Coughlan et al.; "*Crosswatch: A System for Providing Guidance to Visually Impaired Travelers at Traffic Intersections*"; Journal of Assistive Technologies 7.2; 2013; 17 pages.
D'Andrea, Frances Mary; "*More than a Perkins Brailler: A Review of the Mountbatten Brailler, Part 1*"; AFB AccessWorld Magazine; vol. 6, No. 1, Jan. 2005; 9 pages.
De Choudhury et al. "Automatic Construction of Travel Itineraries Using Social Breadcrumbs," pp. 35-44; Jun. 2010.
Dias et al.; "*Enhancing an Automated Braille Writing Tutor*"; IEEE/RSJ International Conference on Intelligent Robots and Systems; Oct. 11-15 2009; 7 pages.
Dowling et al.; "*Intelligent Image Processing Constraints for Blind Mobility Facilitated Through Artificial Vision*"; 8th Australian and NewZealand Intelligent Information Systems Conference (ANZIIS); Dec. 10-12, 2003; 7 pages.
eBay; Matin (Made in Korea) Neoprene Canon Dslr Camera Curved Neck Strap #6782; http://www.ebay.com/itm/Matin-Made-in-Korea-Neoprene-Canon-Dslr-Camera-Curved-Neck-Strap-6782-/281608526018?hash=item41912d18c2:g:~pMAA0Swe-FU6zDa ; 4 pages.
Eccles, Lisa; "*Smart Walker Detects Obstacles*"; Electronic Design; http://electronicdesign.com/electromechanical/smart-walker-detects-obstacles; Aug. 20, 2001; 2 pages.
Frizera et al.; "*The Smart Walkers as Geriatric Assistive Device. The SIMBIOSIS Purpose*"; Gerontechnology, vol. 7, No. 2; Jan. 30, 2008; 6 pages.
Garaj et al.; "A System for Remote Sighted Guidance of Visually Impaired Pedestrians"; the British Journal of Visual Impairment; vol. 21, No. 2, 2003; 9 pp.
Ghiani, et al.; "*Vibrotactile Feedback to Aid Blind Users of Mobile Guides*"; Journal of Visual Languages and Computing 20; 2009; 13 pages.
Glover et al.; "*A Robotically-Augmented Walker for Older Adults*"; Carnegie Mellon University, School of Computer Science; Aug. 1, 2003; 13 pages.
Graf, Christian; "*Verbally Annotated Tactile Maps—Challenges and Approaches*"; Spatial Cognition VII, vol. 6222; Aug. 15-19, 2010; 16 pages.
Graft, Birgit; "*An Adaptive Guidance System for Robotic Walking Aids*"; Journal of Computing and Information Technology—Cit 17; 2009; 12 pages.
Greenberg et al.; "*Finding Your Way: A Curriculum for Teaching and Using the Braillenote with Sendero GPS 2011*"; California School for the Blind; 2011; 190 pages.
Guerrero et al.; "*An Indoor Navigation System for the Visually Impaired*"; Sensors vol. 12, Issue 6; Jun. 13, 2012; 23 pages.
Guy et al; "*CrossingGuard: Exploring Information Content in Navigation Aids for Visually Impaired Pedestrians*" Proceedings of the SIGCHI Conference on Human Factors in Computing Systems; May 5-10, 2012; 10 pages.
Hamid, Nazatul Naquiah Abd; "*Facilitating Route Learning Using Interactive Audio-Tactile Maps for Blind and Visually Impaired People*"; CHI 2013 Extended Abstracts; Apr. 27, 2013; 6 pages.
Helal et al.; "*Drishti: An Integrated Navigation System for Visually Impaired and Disabled*"; Fifth International Symposium on Wearable Computers; Oct. 8-9, 2001; 8 pages.
Hesch et al.; "*Design and Analysis of a Portable Indoor Localization Aid for the Visually Impaired*"; International Journal of Robotics Research; vol. 29; Issue 11; Sep. 2010; 15 pgs.
Heyes, Tony; "*The Sonic Pathfinder An Electronic Travel Aid for the Vision Impaired*"; http://members.optuszoo.com.au/aheyew40/pa/pf_blerf.html; Dec. 11, 2014; 7 pages.

(56) References Cited

OTHER PUBLICATIONS

Joseph et al.; "Visual Semantic Parameterization—To Enhance Blind User Perception for Indoor Navigation"; Multimedia and Expo Workshops (ICMEW), 2013 IEEE International Conference; Jul. 15, 2013; 7 pages.
Kalra et al.; "A Braille Writing Tutor to Combat Illiteracy in Developing Communities"; Carnegie Mellon University Research Showcase, Robotics Institute; 2007; 10 pages.
Kammoun et al.; "Towards a Geographic information System Facilitating Navigation of Visually Impaired Users"; Springer Berlin Heidelberg; 2012; 8 pages.
Kayama et al.; "Outdoor Environment Recognition and Semi-Autonomous Mobile Vehicle for Supporting Mobility of the Elderly and Disabled People"; National Institute of Information and Communications Technology, vol. 54, No. 3; Aug. 2007; 11 pages.
Kirinic et al.; "Computers in Education of Children with Intellectual and Related Developmental Disorders"; International Journal of Emerging Technologies in Learning, vol. 5, 2010, 5 pages.
Krishna et al.; "A Systematic Requirements Analysis and Development of an Assistive Device to Enhance the Social Interaction of People Who are Blind or Visually Impaired"; Workshop on Computer Vision Applications for the Visually Impaired; Marseille, France; 2008; 12 pages.
Kumar et al.; "An Electronic Travel Aid for Navigation of Visually Impaired Persons"; Communications Systems and Networks (COMSNETS), 2011 Third International Conference; Jan. 2011; 5 pages.
Lee et al.; "Adaptive Power Control of Obstacle Avoidance System Using Via Motion Context for Visually Impaired Person." International Conference on Cloud Computing and Social Networking (ICCCSN), Apr. 26-27, 2012 4 pages.
Lee et al.; "A Walking Guidance System for the Visually Impaired"; International Journal of Pattern Recognition and Artificial Intelligence; vol. 22; No. 6; 2008; 16 pages.
Mann et al.; "Blind Navigation with a Wearable Range Camera and Vibrotactile Helmet"; $19^{th}$ ACM International Conference on Multimedia; Nov. 28, 2011; 4 pages.
Mau et al.; "BlindAid: An Electronic Travel Aid for the Blind;" The Robotics Institute, Carnegie Mellon University; 27 pages; May 2008.
Meijer, Dr. Peter B.L.; "Mobile OCR, Face and Object Recognition for the Blind"; The vOICe, www.seeingwithsound.com/ocr.htm; Apr. 18, 2014; 7 pages.
Merino-Garcia, et al.; "A Head-Mounted Device for Recognizing Text in Natural Sciences"; CBDAR'11 Proceedings of the $4^{th}$ International Conference on Camera-Based Document Analysis and Recognition; Sep. 22, 2011; 7 pages.
Merri et al.; "The Instruments for a Blind Teacher of English: The challenge of the board"; European Journal of Psychology of Education, vol. 20, No. 4 (Dec. 2005), 15 pages.
Newegg; Motorola Behind the Neck Stereo Bluetooth Headphone Black/Red Bulk (S9)—OEM; http://www.newegg.com/Product/Product.aspx?Item—N82E16875982212&Tpk=n82e16875982212; 3 pages.
Newegg; Motorola S10-HD Bluetooth Stereo Headphone w/ Comfortable Sweat Proof Design; http://www.newegg.com/Product/Product.aspx?Item=9SIA0NW2G39901&Tpk=9sia0nw2g39901; 4 pages.
Nordin et al.; "Indoor Navigation and Localization for Visually Impaired People Using Weighted Topological Map"; Journal of Computer Science vol. 5, Issue 11; 2009; 7 pages.
Omron; Optical Character Recognition Sensor User's Manual; 2012; 450 pages.
OrCam; www.orcam.com; Jul. 22, 2014; 3 pages.
Pagliarini et al.; "Robotic Art for Wearable"; Proceedings of EUROSIAM: European Conference for the Applied Mathematics and Informatics 2010; 10 pages.
Rodriquez-Losada et al.; "Guido, the Robotic Smart Walker for the Frail Visually Impaired"; IEEE International Conference on Robotics and Automation (ICRA); Apr. 18-22, 2005; 15 pages.
Science Daily; "Intelligent Walker Designed to Assist the Elderly and People Undergoing Medical Rehabilitation"; http://www.sciencedaily.com/releases/2008/11/081107072015.htm; Jul. 22, 2014; 4 pages.
Shen et al. "Walkie-Markie: Indoor Pathway Mapping Made Easy," $10^{th}$ USENIX Symposium on Networked Systems Design and Implementation (NSDI' 13); pp. 85-98, 2013.
Shoval et al.; "Navbelt and the Guidecane—Robotics-Based Obstacle-Avoidance Systems for the Blind and Visually Impaired"; IEEE Robotics & Automation Magazine, vol. 10, Issue 1; Mar. 2003; 12 pages.
Shoval et al.; "The Navbelt— A Computerized Travel Aid for the Blind"; RESNA Conference, Jun. 12-17, 1993; 6 pages.
Singhal; "The Development of an Intelligent Aid for Blind and Old People;" Emerging Trends and Applications in Computer Science (ICETACS), 2013 $1^{st}$ International Conference; pp. 182-185; Sep. 13, 2013.
Sudol et al.; "LookTel—A Comprehensive Platform for Computer-Aided Visual Assistance "; Computer Vision and Pattern Recognition Workshops (CVPRW), 2010 IEEE Computer Society Conference, Jun. 13-18, 2010, 8 pages.
The Nex Band; http://www.mightycast.com/#faq; May 19, 2015; 4 pages.
Treuillet; "Outdoor/Indoor Vision-Based Localization for Blind Pedestrian Navigation Assistance"; WSPC/Instruction File; May 23, 2010; 16 pages.
Trinh et al.; "Phoneme-based Predictive Text Entry Interface"; Proceedings of the 16th International ACM SIGACCESS Conference on Computers & Accessibility; Oct. 2014; 2 pgs.
Tu et al. "Crowdsourced Routing II D2.6" 34 pages; 2012.
Ward et al.; "Visual Experiences in the Blind Induced by an Auditory Sensory Substitution Device"; Journal of Consciousness and Cognition; Oct. 2009; 30 pages.
Wilson, Jeff, et al. "Swan: System for Wearable Audio Navigation"; 11th IEEE International Symposium on Wearable Computers; Oct. 11-13, 2007; 8 pages.
Wu et al. "Fusing Multi-Modal Features for Gesture Recognition," Proceedings of the $15^{th}$ ACM on International Conference on Multimodal Interaction, Dec. 9, 2013, ACM, pp. 453-459.
Yabu et al.; "Development of a Wearable Haptic Tactile Interface as an Aid for the Hearing and/or Visually Impaired;" NTUT Education of Disabilities; vol. 13; pp. 5-12; 2015.
Yang, et al.; "Towards Automatic Sign Translation"; The Interactive Systems Lab, Carnegie Mellon University; 2001; 5 pages.
Yi, Chucai; "Assistive Text Reading from Complex Background for Blind Persons"; CBDAR'11 Proceedings of the $4^{th}$ International Conference on Camera-Based Document Analysis and Recognition; Sep. 22, 2011; 7 pages.
Zeng et al.; "Audio-Haptic Browser for a Geographical Information System"; ICCHP 2010, Part II, LNCS 6180; Jul. 14-16, 2010; 8 pages.
Zhang et al.; "A Multiple Sensor-Based Shoe-Mounted User Interface Designed for Navigation Systems for the Visually Impaired"; $5^{th}$ Annual ICST Wireless Internet Conference (WICON); Mar. 1-3, 2010; 9 pages.
Shidujaman et al.; "Design and navigation Prospective for Wireless Power Transmission Robot;" IEEE; Jun. 2015.
Wang, et al.; "Camera-Based Signage Detection and Recognition for Blind Persons"; $13^{th}$ International Conference (ICCHP) Part 2 Proceedings; Jul. 11-13, 2012; 9 pages.
Paladugu et al.; "GoingEasy® with Crowdsourcing in the Web 2.0 World for Visually Impaired Users: Design and User Study"; Arizona State University; 8 pages.
Katz et al; "NAVIG: Augmented Reality Guidance System for the Visually Impaired"; Virtual Reality (2012) vol. 16; 2012; 17 pages.
Rodriguez et al.; "Assisting the Visually Impaired: Obstacle Detection and Warning System by Acoustic Feedback"; Sensors 2012; vol. 12; 21 pages.
Pawar et al.; "Multitasking Stick for Indicating Safe Path to Visually Disable People"; IOSR Journal of Electronics and Communication Engineering (IOSR-JECE), vol. 10, Issue 3, Ver. II; May-Jun 2015; 5 pages.

(56) References Cited

OTHER PUBLICATIONS

Parkes, Don; "*Audio Tactile Systems for Designing and Learning Complex Environments as a Vision Impaired Person: Static and Dynamic Spatial Information Access*"; EdTech-94 Proceedings; 1994; 8 pages.

Ramya, et al.; "*Voice Assisted Embedded Navigation System for the Visually Impaired*"; International Journal of Computer Applications; vol. 64, No. 13, Feb. 2013; 7 pages.

Park, Sungwoo; "*Voice Stick*"; www.yankodesign.com/2008/08/21/voice-stick; Aug. 21, 2008; 4 pages.

Rentschler et al.; "*Intelligent Walkers for the Elderly: Performance and Safety Testing of VA-PAMAID Robotic Walker*"; Department of Veterans Affairs Journal of Rehabilitation Research and Development; vol. 40, No. 5; Sep./Oct. 2013; 9 pages.

Pawar et al.; "Review Paper on Multitasking Stick for Guiding Safe Path for Visually Disable People;" *IJPRET*; vol. 3, No. 9; pp. 929-936; 2015.

Ram et al.; "The People Sensor: A Mobility Aid for the Visually Impaired;" 2012 $16^{th}$ International Symposium on Wearable Computers; pp. 166-167; 2012.

Pitsikalis et al. "Multimodal Gesture Recognition via Multiple Hypothese Rescoring." Journal of Machine Learning Research, Feb. 2015, pp. 255-284.

Rodriguez et al; "CrowdSight: Rapidly Prototyping Intelligent Visual Processing Apps"; AAAI Human Computation Workshop (HCOMP); 2011; 6 pages.

Ran et al.; "*Drishti: An Integrated Indoor/Outdoor Blind Navigation System and Service*"; Proceeding PERCOM '04 Proceedings of the Second IEEE International Conference on Pervasive.Computing and Communications (PerCom'04); 2004; 9 pages.

Zhang, Shanjun; Yoshino, Kazuyoshi; A Braille Recognition System by the Mobile Phone with Embedded Camera; 2007; IEEE.

Diallo, Amadou; Sep. 18, 2014; Apple iOS8: Top New Features, Forbes Magazine.

N. Kalar, T. Lawers, D. Dewey, T. Stepleton, M.B. Dias; Iterative Design of a Braille Writing Tutor to Combat Illiteracy; Aug. 30, 2007; IEEE.

\* cited by examiner

| LANDMARK | LOCATION |
|---|---|
| | |
| MALL ENTRANCE | W 32.22.104 X N 118.03.872 |
| REDWOOD | 25M @ 129 DEGREES FROM ENTRANCE |
| PASTERIES | 15M @ 360 DEGREES FROM REDWOOD |
| BAKERY | 15M @ 360 DEGREES FROM PASTRIES |
| SHOES | 40M @ 270 DEGREES FROM BAKERY |
| FASHION OUTLET | 15M @ 180 DEGREES FROM SHOES |
| PERFUMES | 15M @ 180 DEGREES FROM FASHION OUTLET |
| FOUNTAIN | 20M @ 270 DEGREES FROM REDWOOD, 20M @ 90 DEGREES FROM PERFUMES |
| UP ESCALATOR ENTRANCE | 10M @ 270 DEGREES FROM PASTERIES, 30M @ 90 DEGREES FROM FASHION OUTLET |
| UP ESCALATOR EXIT | 15M @ 360 DEGREES FROM UP ESCALATOR ENTRANCE, 12M UP FROM UP ESCALATOR ENTRANCE |
| DOWN ESCALATOR ENTRANCE | 15M @ 180 DEGREES FROM DOWN ESCALATOR EXIT, 12M DOWN FROM DOWN ESCALATOR EXIT |
| DOWN ESCALATOR EXIT | 10M @ 90 DEGREES FROM FASHION OUTLET, 30M @ 270 DEGREES FROM PASTRIES |
| TELEPHONES | 10M @ 90 DEGREES FROM UP ESCALATOR EXIT |
| MUSIC | 15M @ 180 DEGREES FROM TELEPHONES |

| ROUTE FROM REDWOOD TO MUSIC |
|---|
| REDWOOD |
| PASTRIES |
| UP ESCALATOR ENTRANCE |
| UP ESCALATOR EXIT |
| TELEPHONES |
| MUSIC |

FIG. 7

WEARABLE SYSTEM FOR PROVIDING WALKING DIRECTIONS

BACKGROUND

1. Field

The present disclosure relates to wearable computing devices and, more particularly, to wearable computing devices designed to detect and store a plurality of landmarks and to use the landmarks to provide navigation instructions.

2. Description of the Related Art

Navigation systems have been in use for some time. Early navigation systems were included with high-end vehicles and provided navigation instructions from a starting location to another address. After a while, navigation systems began to be provided as separate components that could be carried around with a user. In addition to providing directions to a specific address, navigation systems began to store identifiers of destinations such as restaurant names and stores. As technology became smaller and more efficient, mobile devices such as mobile phones began to include navigation features.

In order to provide navigation services, a provider of navigation systems must create a map that includes passageways (such as roadways) and addresses or destinations. Such map creation is a time-consuming, involved, and expensive process. Fortunately for providers of navigation systems for roadways, such maps are readily available.

Although maps for roadway navigation are readily available, such maps are not available for walking navigation. Although some walking routes occur along roadways, many more walking routes occur away from roadways. For example, many walking routes occur through shopping centers and malls, along trails, and the like. In most locations, there are significantly more walking routes than driving routes.

Thus, there is a need in the art for systems and methods for creating a database of landmarks and locations that is usable for providing walking navigation instructions.

SUMMARY

Described herein is a wearable computing device for creating a database usable for navigation. The wearable computing device includes an input device designed to receive input from the user. The wearable computing device also includes a global positioning system (GPS) sensor designed to detect a current location of the wearable computing device. The wearable computing device also includes an inertial measurement unit (IMU) designed to detect inertial measurement data of the wearable computing device. The wearable computing device also includes a camera designed to detect image data corresponding to an environment of the wearable computing device. The wearable computing device also includes a memory designed to store a database including a plurality of landmarks and corresponding locations. The wearable computing device also includes a mobile processor that is coupled to the input device, the GPS sensor, the IMU, the camera, and the memory. The mobile processor is designed to receive first user input from the input device indicating that the user is traveling from a starting location to a destination location. The mobile processor is also designed to receive second user input from the input device as the user is traveling indicating that new landmarks are present. The mobile processor is also designed to determine locations of the new landmarks based on at least one of the current location of the wearable computing device, the inertial measurement data of the wearable computing device, or the detected image data corresponding to the environment of the wearable computing device. The mobile processor is also designed to update the database to include the new landmarks and the locations of the new landmarks. The mobile processor is also designed to update the database to include an ordered list of landmarks including the new landmarks placed in order of their appearance from the starting location to the destination location such that the ordered list of landmarks corresponds to a route from the starting location to the destination location.

Also described is a wearable computing device for providing navigation instructions to a user. The wearable computing device includes an input device designed to receive input from the user. The wearable computing device also includes an output device designed to output data. The wearable computing device also includes a global positioning system (GPS) sensor designed to detect a current location of the wearable computing device. The wearable computing device also includes an inertial measurement unit (IMU) designed to detect inertial measurement data of the wearable computing device. The wearable computing device also includes a camera designed to detect image data corresponding to an environment of the wearable computing device. The wearable computing device also includes a memory designed to store a database including a plurality of landmarks and corresponding locations. The wearable computing device also includes a mobile processor coupled to the input device, the output device, the GPS sensor, the IMU, the camera, and the memory. The mobile processor is designed to receive first user input from the input device indicating that the user is traveling from a starting location to a destination location. The mobile processor is also designed to receive second user input from the input device as the user is traveling indicating that new landmarks are present. The mobile processor is also designed to determine locations of the new landmarks based on at least one of the current location of the wearable computing device, the inertial measurement data of the wearable computing device, or the detected image data corresponding to the environment of the wearable computing device. The mobile processor is also designed to update the database to include the new landmarks and the locations of the new landmarks. The mobile processor is also designed to update the database to include an ordered list of landmarks including the new landmarks placed in order of their appearance from the starting location to the destination location such that the ordered list of landmarks corresponds to a route from the starting location to the destination location. The mobile processor is also designed to receive third user input from the input device at a later time corresponding to a request for navigation instructions from the starting location to the destination location. The mobile processor is also designed to determine the navigation instructions based on the ordered list of landmarks. The mobile processor is also designed to cause the output device to output the navigation instructions.

Also described is a method for creating a database usable for navigation by a wearable computing device. The method includes detecting, by a global positioning system (GPS) sensor, a current location of the wearable computing device. The method also includes detecting, by an inertial measurement unit (IMU), inertial measurement data of the wearable computing device. The method also includes detecting, by a camera, image data corresponding to an environment of the wearable computing device. The method also includes storing, in a memory, a database including a plurality of landmarks and corresponding locations. The method also includes receiving, via an input device, first user input indicating that the user is traveling from a starting location to a destination location. The method also includes receiving, via the input device, second user input indicating that new landmarks are present as the user is traveling from the starting location to the destination location. The method also includes determining, by a mobile processor, locations of the new landmarks based on at least one of the current location of the wearable computing device, the inertial measurement data of the wearable computing device, or the detected image data corresponding to the environment of the wearable computing device. The method also includes updating, by the mobile processor, the database to include the new landmarks and the locations of the new landmarks. The method also includes updating, by the mobile processor, the database to include an ordered list of landmarks including the new landmarks placed in order of their appearance from the starting location to the destination location such that the ordered list of landmarks corresponds to a route from the starting location to the destination location.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 7 illustrates an exemplary database and an ordered list of landmarks present in the example illustrated in FIG. 6 according to an embodiment of the present invention;

DETAILED DESCRIPTION

The present invention provides wearable computing devices that can be used to create a database of landmarks and corresponding locations, along with ordered lists of landmarks that each correspond to navigation instructions from a starting location to a destination location. The wearable computing device includes a camera, an inertial measurement unit (IMU), and a global positioning (GPS) sensor. An input device receives user input corresponding to nearby landmarks and an input/output port is used to wirelessly connect the wearable computing device to a database that can be edited. A mobile processor can receive the user input corresponding to the landmarks, detect additional data corresponding to the landmarks, determine a location of each landmark, and store the data and locations in the database. As additional landmarks are detected, the mobile processor may create an ordered list of landmarks that correspond to a route between a starting location and a destination location. The mobile processor can also retrieve an ordered list and other data associated with the landmarks on the list from the database, and use the retrieved data to provide navigation instructions.

The wearable computing device provides several benefits and advantages such as creation of a crowd sourced database of landmarks and corresponding locations that can be used for providing walking navigation instructions. The crowd sourced database is advantageous because it reduces the cost and the amount of time required for a navigation provider to create navigation maps. The crowd sourced database may also include user rankings of the navigation instructions so that future users can advantageously select an optimal route. The wearable computing device provides additional benefits such as the ability to access a database that includes a current stock of products in a desired retail location or store. This beneficially allows a user to ensure that all desired products are in stock at the retail location or store prior to making a trip to the retail location or store. The database of products may also advantageously include locations of the products within the retail location or store, which can be used by the wearable computing device to determine a navigation route to each of the desired products.

Figure 1:
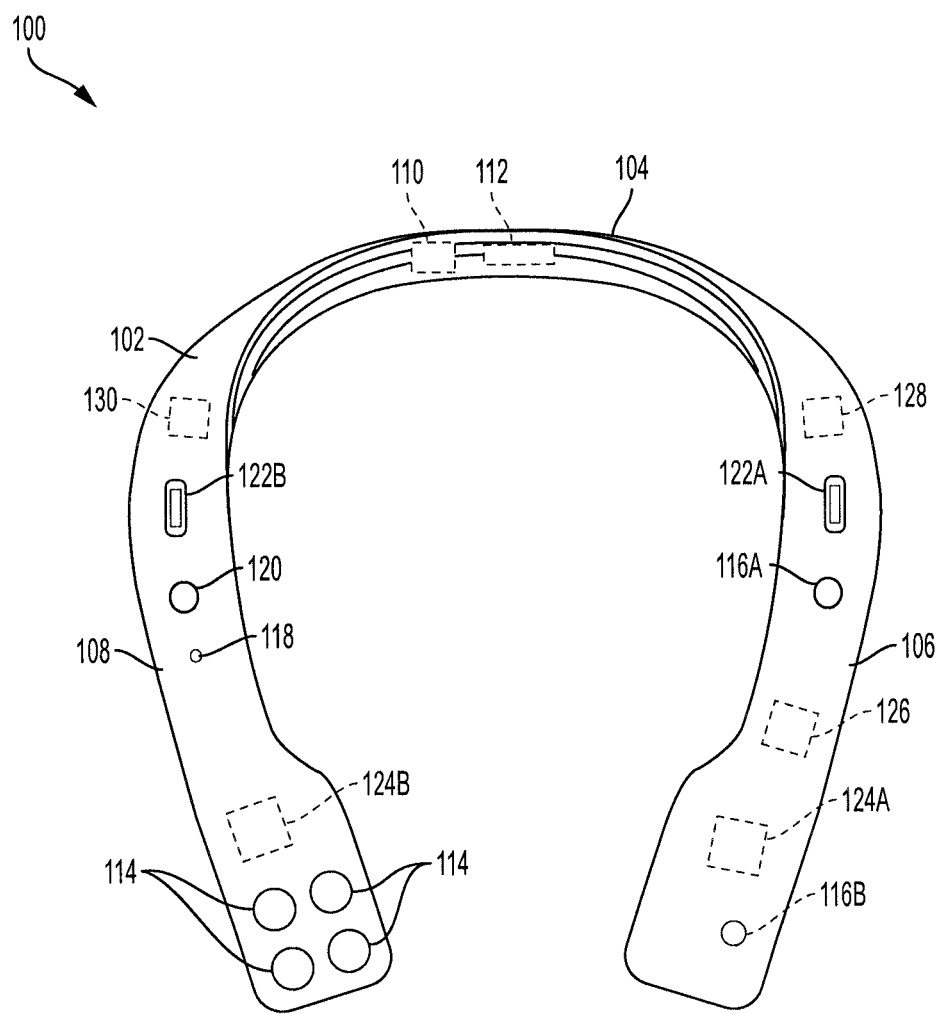
FIG. 1 is a drawing of a wearable computing device for creating a database of landmarks and corresponding locations and using the database to provide navigation instructions according to an embodiment of the present invention.

Turning to FIG. 1, a wearable computing device 100 has an outer casing, or body, 102 having a shape designed to be worn by a user. In particular, the body 102 has a neck portion 104 designed to rest against a back of a neck of the user. The body 102 also includes a first side portion 106 and a second side portion 108 each configured to extend across a shoulder of the user and to rest on a front of the user. In that regard, the wearable computing device 100 may be worn in a similar manner as a necklace. Although the disclosure is directed to the wearable computing device 100 having a U-shape, one skilled in the art will realize that the features described herein can be implemented in a wearable computing device having another shape such as eyeglasses or earpieces.

The wearable computing device 100 includes a mobile processor 110 and a memory 112. In some embodiments, the mobile processor 110 and the memory 112 may be physically attached to the body 102, for example, positioned in a cavity defined by the neck portion 104. The memory 112 may include any memory for storing non-transitory data including instructions to be performed by the mobile processor 110.

The mobile processor 110 may receive inputs from various components of the wearable computing device 100 and may determine output data based on the various inputs. In some embodiments, the wearable computing device 100 may be designed to provide aid to individuals having physical impairments such as a visual impairment, hearing loss, or the like. For example, the wearable computing device 100 may be designed to provide navigation and social awareness features to vision-impaired individuals.

The wearable computing device 100 may include multiple components capable of receiving or detecting data. For example, the wearable computing device 100 may include one or more buttons 114, a stereo pair of cameras 116, a microphone 118, an input/output port 126, a GPS sensor 128, and an IMU 130. Each of the buttons 114, the stereo pair of cameras 116, the microphone 118, the input/output port 126, the GPS sensor 128, and the IMU 130 may be electrically coupled to the mobile processor 110 and physically attached to the body 102.

The buttons 114 may receive input from a user. In some embodiments, the wearable computing device 100 may include additional or alternative input devices such as a touch screen, a dial, a keypad, or the like.

The stereo pair of cameras 116 may include a first camera 116A and a second camera 116B. Each of the first camera 116A and the second camera 116B may be capable of detecting image data corresponding to an environment of the wearable computing device 100. The first camera 116A and the second camera 116B may be spaced apart by a known distance. In that regard, the mobile processor 110 may receive image data from the stereo pair of cameras 116 and may determine depth information corresponding to objects in the environment based on the received image data and the known distance between the first camera 116A and the second camera 116B. In some embodiments, the wearable computing device 100 may include one or more additional or alternative cameras. For example, the wearable computing device 100 may include a single camera instead of the stereo pair of cameras 116.

The microphone 118 may be capable of detecting audio data corresponding to the environment of the wearable computing device 100. For example, the microphone 118 may be capable of detecting speech data corresponding to speech of the user or of another person. In some embodiments, the user may provide input data to the mobile processor 110 by speaking commands that are received by the microphone 118. The microphone 118 may also be capable of detecting other sounds in the environment such as a fountain, sounds from an amusement park, or the like.

The input/output port 126 may connect to the cloud or to remote computing devices via a wired or wireless connection. For example, the input/output port may be capable of transmitting and/or receiving signals corresponding to an 802.11a/b/g/n/ac (e.g., Wi-Fi) protocol, a wireless communications protocol using short wavelength UHF radio waves and defined at least in part by IEEE 802.15.1 (e.g., the BLUETOOTH protocol maintained by Bluetooth Special Interest Group), a cellular protocol, an infrared protocol, an optical protocol, and/or a near field communication (NFC) protocol. In that regard, the mobile processor 110 may communicate with the cloud or the remote computing device via the input/output port 126.

The GPS sensor 128 detects location info illation corresponding to a location of the wearable computing device 100. The IMU 130 detects inertial measurement data corresponding to inertial measurement of the wearable computing device 100. For example, the IMU 130 may detect a velocity or an orientation of the wearable computing device 100.

The wearable computing device 100 may also include a sensor 120. The sensor 120 may be electrically coupled to the mobile processor 110 and physically attached to the body 102. The sensor 120 may include one or more of a camera, a temperature sensor, an air pressure sensor, a moisture or humidity sensor, a gas detector or other chemical sensor, a sound sensor, a pH sensor, a smoke detector, a metal detector, an actinometer, an altimeter, a depth gauge, a compass, a radiation sensor, a motion detector, a light sensor or other sensor.

The wearable computing device 100 may include one or more output devices including a first speaker 122A and a second speaker 122B. The speakers 122 may each be electrically coupled to the mobile processor 110 and physically attached to the body 102. Each of the speakers 122 is designed to output audio data based on an instruction from the mobile processor 110. The wearable computing device may also include a pair of vibration units 124 including a first vibration unit 124A and a second vibration unit 124B. The vibration units 124 may include a motor and are designed to output haptic feedback such as vibrations based on an instruction from the mobile processor 110.

The wearable computing device 100 may be designed to create a database of landmarks and other location markers usable for providing navigation instructions. The wearable computing device 100 may also be capable of providing navigation instructions based on the database of landmarks or other location markers. For example, as the wearable computing device 100 is moving from a starting location to a destination location that is known by the wearable computing device 100, a user of the wearable computing device may input data indicating that a landmark is nearby. Likewise, a sensor of the wearable computing device 100 may detect a location marker corresponding to an object, a location, or the like. As the user reaches the destination location, the database may include an ordered list of multiple landmarks or location markers between the starting location and the destination location. The mobile processor 110 may later use the ordered list of landmarks or location markers to provide a navigational route from the starting location to the destination location.

Figure 2:
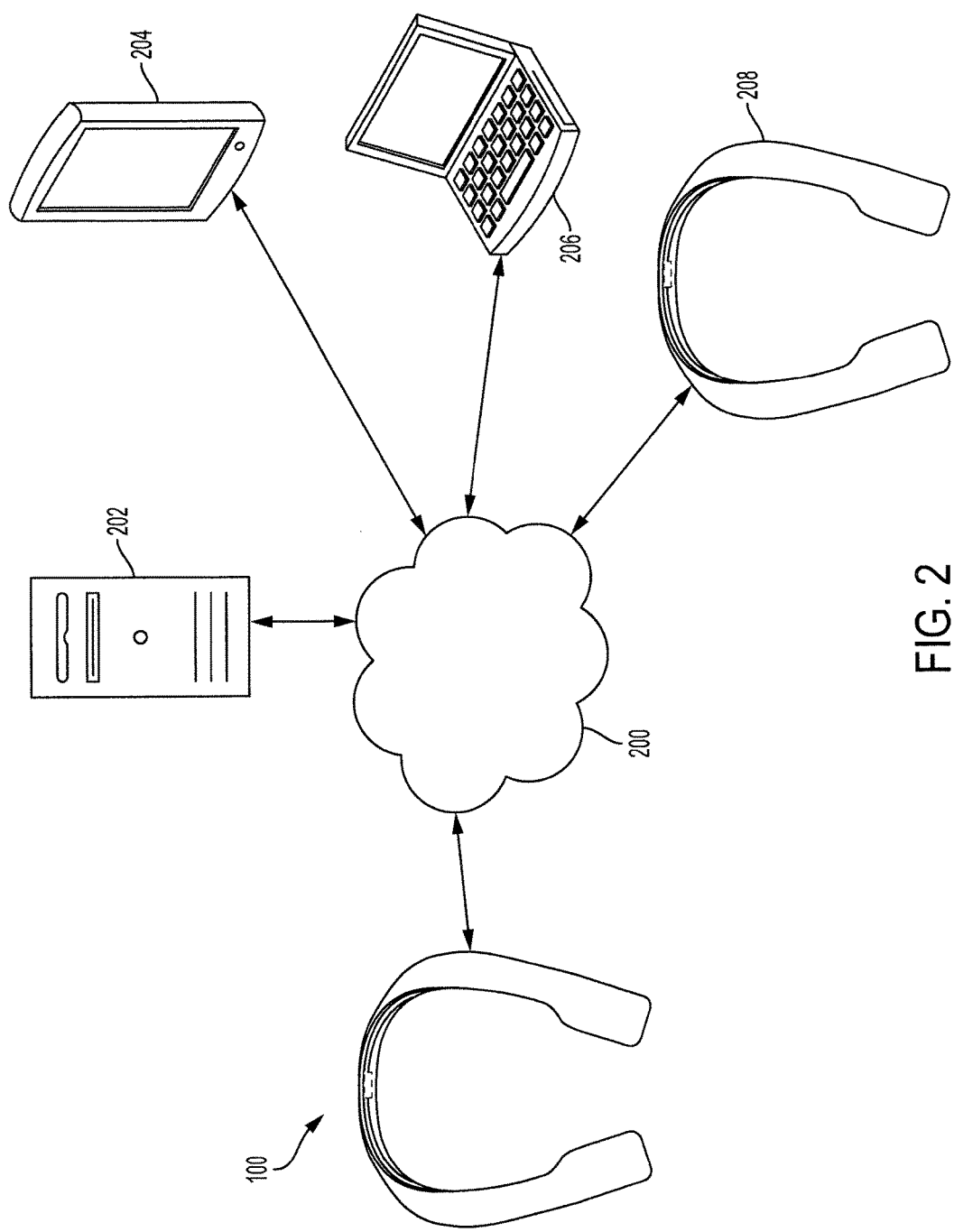
FIG. 2 is a drawing illustrating how the wearable computing device of FIG. 1 and other electronic devices can connect to a server that stores a database of landmarks and corresponding locations according to an embodiment of the present invention.

Referring now to FIGS. 1 and 2, the mobile processor 110 may communicate with the cloud 200 via the input/output port 126. A server 202 having a database, such as a database for storing landmarks and location markers, may be connected to the cloud 200. In that regard, the wearable computing device 100 may access the database stored in the server 202.

Additional electronic devices, such as a mobile telephone 204, a computer 206, and another wearable computing device 208, may also be connected to the cloud 200 and have access to the server 202 and, thus, the database. In that regard, the wearable computing device 100, the mobile telephone 204, the computer 206, and the other wearable computing device 208 may access and update data in the database.

Figure 3:
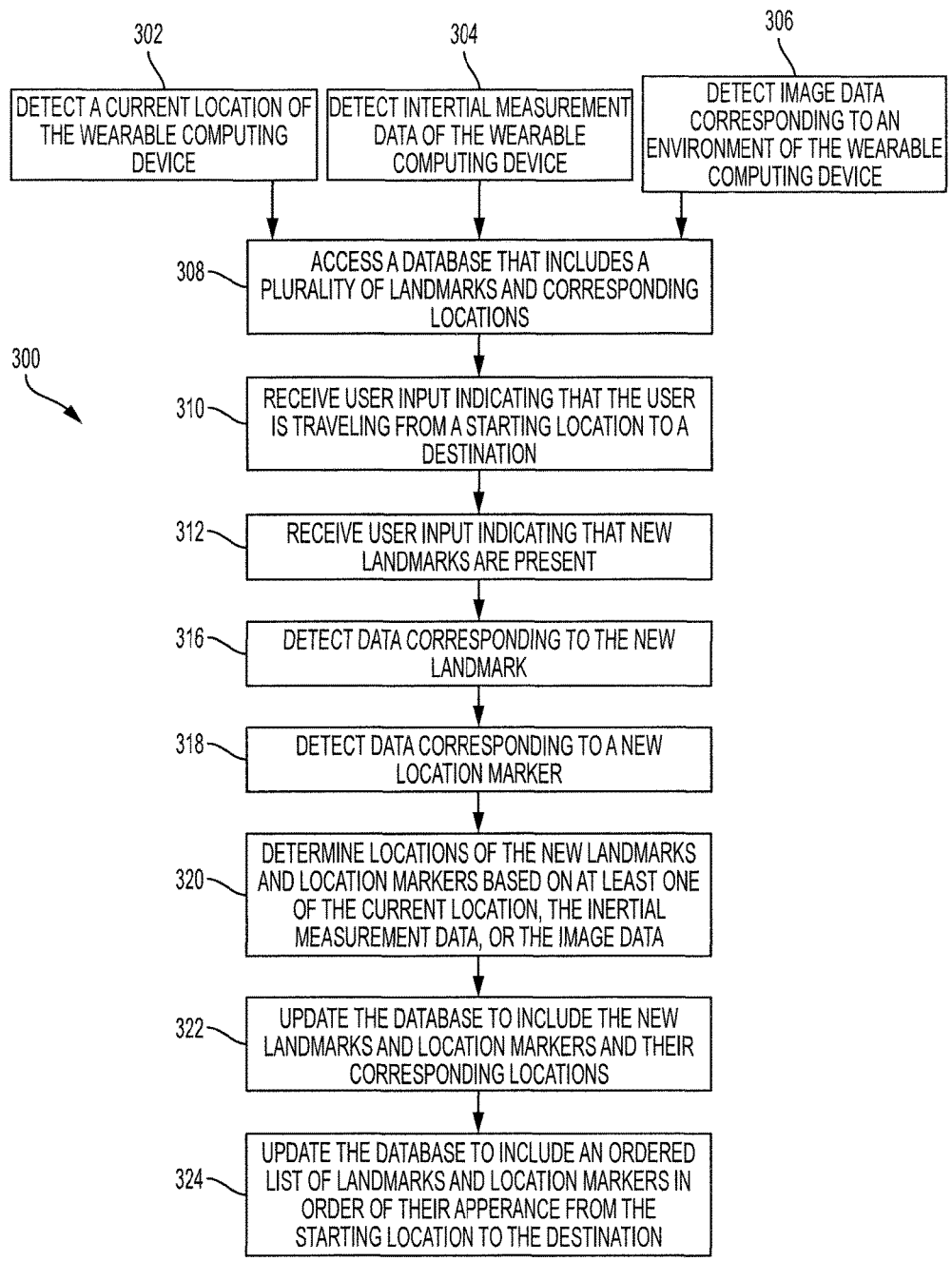
FIG. 3 is a flowchart illustrating a method for creating a database of landmarks and corresponding locations along with an ordered list of landmarks that corresponds to a navigation route from a starting location to a destination location according to an embodiment of the present invention.

Turning now to FIG. 3, a method 300 for creating and updating a database of landmarks and location markers is shown. The method 300 may be performed by components of a wearable computing device such as the mobile processor 110 of the wearable computing device 100 of FIG. 1. A user of the wearable computing device may utilize the method 300 to help build the database, which may be used at a later time for providing navigation instructions.

In block 302, a current location of the wearable computing device is detected. The current location may be detected by a GPS sensor. In block 304, inertial measurement data of the wearable computing device is detected. The inertial measurement data may be detected by an IMU. In block 306, image data corresponding to an environment of the wearable computing device may be detected. The image data may be detected by one or more cameras.

In block 308, the mobile processor 110 of the wearable computing device may access a database that includes a plurality of landmarks and/or location markers, along with corresponding locations of the landmarks and location markers. The mobile processor 110 may access the database via an input/output port. In some embodiments, the database may be stored locally on the wearable computing device, such as in a memory device. In some embodiments, the database may be stored on a remote server and be accessible by multiple computing devices. The location data associated with each of the landmarks or location markers may include a GPS location, an orientation and/or a distance from another landmark or location marker, or the like.

In block 310, the mobile processor 110 may receive user input indicating that the user is traveling from a starting location to a destination location. The user may provide the starting location and the destination location so that the mobile processor 110 is aware of the fact that landmarks and location markers along the way correspond to a route from the starting location to the destination location. In some embodiments, the user may not provide a starting location or a destination location. In that regard, the mobile processor 110 may still store an ordered list of landmarks and location markers such that any two locations in the ordered list may later be utilized as a starting location and a destination location.

The starting location may be indoors or outdoors. For example, the starting location may include a location in a mall, a shopping center, a street, or the like. If the starting location is not stored as a landmark, the mobile processor 110 may detect data corresponding to the current location of the wearable computing device 100 and save the current location as a landmark.

The destination location may be indoors or outdoors. For example, the destination location may include a store, a particular retail item within the store, an elevator, a street, or the like. In some embodiments, the destination location includes a landmark or a location marker that is stored in the database. In some embodiments, the destination location may not be stored in the database and may be provided as a name, GPS coordinates, or the like. After arriving at the destination location, the mobile processor 110 may store the destination location as a landmark if not yet already stored.

After providing the input indicating that the user is beginning to travel from the starting location to the destination location, the user may begin to notice landmarks along the way. The landmarks may include, for example, a building, a plant, a tree, a sign, a road, a sidewalk, a light, a door, a hallway, a specific aisle or product in a retail store, or the like.

When the user notices a landmark, the user may inform the wearable computing device 100 of the landmark via an input device in block 312. For example, the user may push a button on the wearable computing device 100 to notify the mobile processor 110 that a landmark is present. As another example, the user may speak a command to indicate that the landmark is present. In some embodiments, the user may also provide an identifier of the landmark. For example, the user may say "there is a sidewalk crossing here" or "I am passing by the Gap store."

In some embodiments, the user may provide a distance and orientation to the landmark. For example, the user may say "there is a lamp post 5 feet away at my 2 o'clock" or "I am directly below a streetlight."

In block 316, the wearable computing device 100 may detect data corresponding to the new landmark. The data may include, for example, location data, inertial measurement data, image data, or the like. The data may be detected when the user indicates the presence of the landmark. For example, location data may be detected in response to the mobile processor 110 receiving the user input.

In some embodiments, the wearable computing device may detect data based on information received from the user. For example, the user may indicate that he is approaching the landmark and that the landmark is 5 feet in front of the user. The mobile processor 110 may determine to detect location data when the wearable computing device 100 has traveled the remaining 5 feet to the landmark. As another example, the user may indicate that a landmark is at 90 degrees from the user. The mobile processor 110 may control a camera to rotate such that the landmark is within the field of view of the camera, or may request that the user turn towards the landmarks, so that the camera can detect image data corresponding to the landmark prior to detecting the image data.

The mobile processor 110 may associate the data with the landmark. For example, the mobile processor 110 may associate image data of the landmark with an identifier of the landmark. If an identifier is not provided, the mobile processor 110 may associate the data with nearby landmarks. For example, if the landmark is directly between a first saved landmark and a second saved landmark, the mobile processor 110 may associate image data that corresponds to the present landmark with the first saved landmark and the second saved landmark.

In block 318, the wearable computing device 100 may detect data corresponding to a new location marker. A location marker may be similar to a landmark but may be automatically detected by the wearable computing device 100 instead of received from a user. As with landmarks, location markers may include, for example, a building, a plant, a tree, a sign, a road, a sidewalk, a light, a door, a hallway, a specific aisle or product in a retail store, or the like. The location markers may also include a location without an associated object.

In some embodiments, the mobile processor 110 may periodically detect location markers. For example, the mobile processor 110 may detect a location marker every 10 seconds, 30 seconds, or 1 minute along the route from the starting location to the destination location. As another example, the mobile processor 110 may detect a location marker every 5 feet, 10 feet, 25 feet, or 50 feet along the route from the starting location to the destination location. In some embodiments, the mobile processor 110 may detect location markers only when a predetermined distance or an amount of time has passed since the user has indicated the presence of a landmark.

The location marker may correspond to any object or location that is within the vicinity of the wearable computing device 100 at the time of detecting the location marker. For example, if the wearable computing device 100 is beneath a streetlight when it is time to detect the location marker, the mobile processor 110 may associate the streetlight with the location marker. As another example, if the wearable computing device 100 is 5 feet from a mailbox when it is time to detect the location marker, the mobile processor 110 may associate the mailbox with the location marker, may associate the current location of the wearable computing device 100 with the location marker, or may associate "5 feet from the mailbox" with the location marker.

In block 320, the mobile processor 110 may determine locations of the new landmarks and location markers. The locations of the landmarks and location markers may be determined as the corresponding data is detected or at a later time.

The locations of the new landmarks and location markers may be determined based on a current location of the wearable computing device 100, inertial measurement data, or image data. For example, when a user indicates that a landmark, such as a streetlight, is nearby, the mobile processor 110 may determine that a current location of the wearable computing device 100 is the location of the streetlight. In some embodiments, the mobile processor 110 may analyze image data to determine a distance and a direction to the streetlight and modify the location detected by the GPS sensor with the distance and the direction to the streetlight. In some embodiments, the locations of the landmarks may be provided relative to each other.

For example, a user may indicate that he is beginning to travel from a grocery store entrance to a box of sugar loops cereal. The mobile processor 110 of the wearable computing device 100 may detect image data and location data corresponding to the entrance of the grocery store. The mobile processor 110 may store an identifier, such as "entrance to grocery store," in the database. The mobile processor 110 may also store the image data and the location data corresponding to the entrance in the database and associate the image data and the location data with the identifier.

After the user has moved 5 feet from the entrance, the mobile processor 110 may determine to set a location marker. The mobile processor 110 may provide an identifier of the location marker, such as "location marker 1." The mobile processor 110 may also determine that location marker 1 is 5 feet at 325 degrees from the entrance.

In block 322, the mobile processor 110 may update the database to include the new landmarks and location markers. The mobile processor 110 may include an identifier of the landmark or location marker, detected data associated with the landmark or location marker, and a location of the landmark or location marker. As described above, the location may be an absolute location, such as GPS coordinates, or a relative location, such as relative to another landmark.

As new landmarks and location markers are detected, the mobile processor 110 may record an ordered list of the landmarks and location markers. The ordered list may be placed in an order in which the landmarks and location markers were detected. After the route from the starting location to the destination location is complete, the mobile processor 110 may ensure that the ordered list of landmarks and location markers is stored in the database in block 324. The ordered list of landmarks and location markers may then correspond to a route from the starting location to the destination location. In that regard, if another user desires navigation instructions from the starting location to the destination location, the user may follow the route by traveling towards each of the landmarks and location markers in the order in which they are saved in the database.

The data associated with the landmarks (such as identifiers, image data, location data, or the like) may be stored with the ordered list or separate from the ordered list. In that regard, the ordered list may simply include pointers to landmarks (such as identifiers) or may include all data associated with the landmarks.

Figure 4:
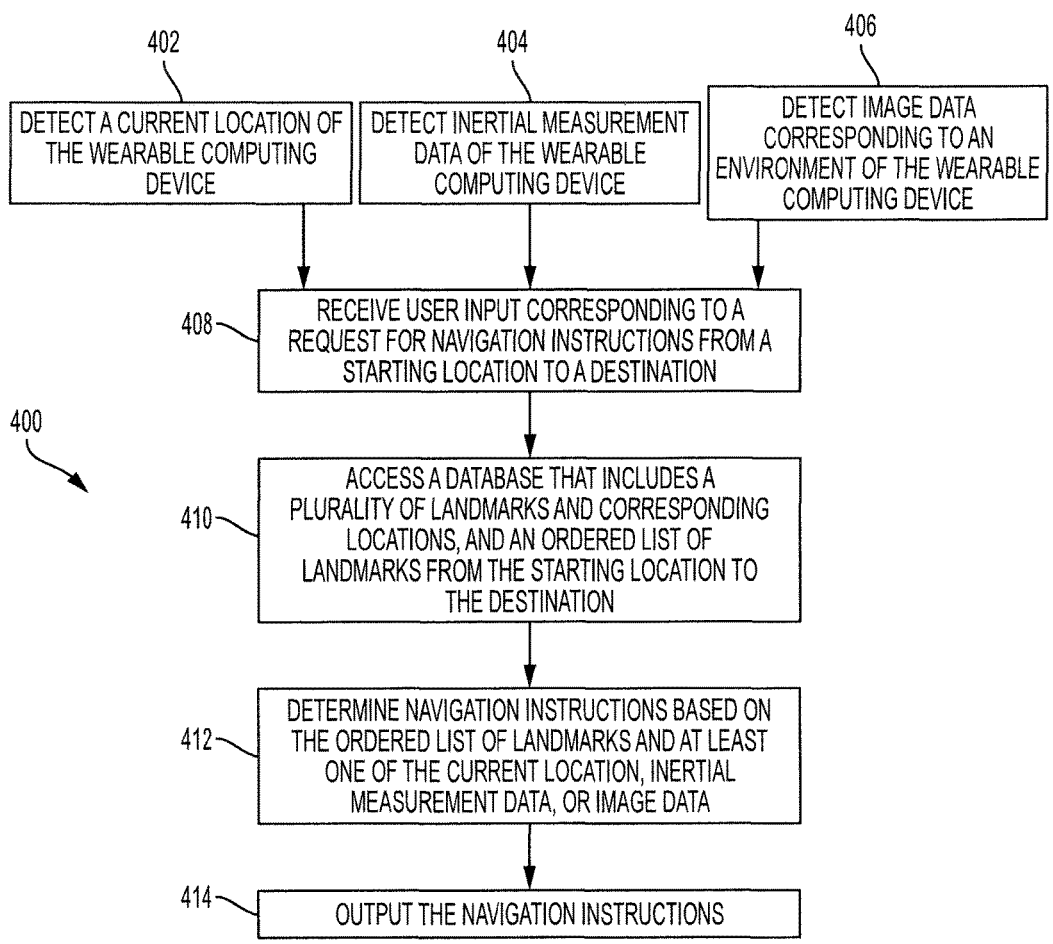
FIG. 4 is a flowchart illustrating a method for using the database of FIG. 3 to provide navigation instructions from a starting location to a destination location according to an embodiment of the present invention.

Turning now to FIG. 4, a method 400 for using a database similar to the database compiled using the method 300 of FIG. 3 is shown. The method 400 may be performed by components of a wearable computing device, such as the wearable computing device 100 of FIG. 1.

In block 402, a current location of the wearable computing device 100 is detected. The current location may be detected by a GPS sensor. In block 404, inertial measurement data of the wearable computing device 100 is detected. The inertial measurement data may be detected by an IMU. In block 406, the image data corresponding to an environment of the wearable computing device 100 may be detected. The image data may be detected by one or more cameras.

In block 408, the mobile processor 110 may receive user input corresponding to a request for navigation instructions from a starting location to a destination location. The mobile processor 110 may receive such input via an input device, such as a touchscreen, buttons, a microphone, or the like.

In block 410, the mobile processor 110 may access a database that includes a plurality of landmarks and location markers, their corresponding locations, and an ordered list of landmarks and location markers from the starting location to the destination location. The database that is accessed in block 410 may be similar to the database that was created using the method 300 of FIG. 3.

In block 412, the mobile processor 110 may determine navigation instructions based on the ordered list of landmarks and at least one of the detected current location, the detected inertial measurement data, or the detected image data. For example, beginning at the starting location of the ordered list, the mobile processor 110 may begin to output data corresponding to the next landmark. The output data may include the identifier of the next landmark, the detected data that corresponds to the next landmark, the location of the next landmark, or the like.

Figure 5:
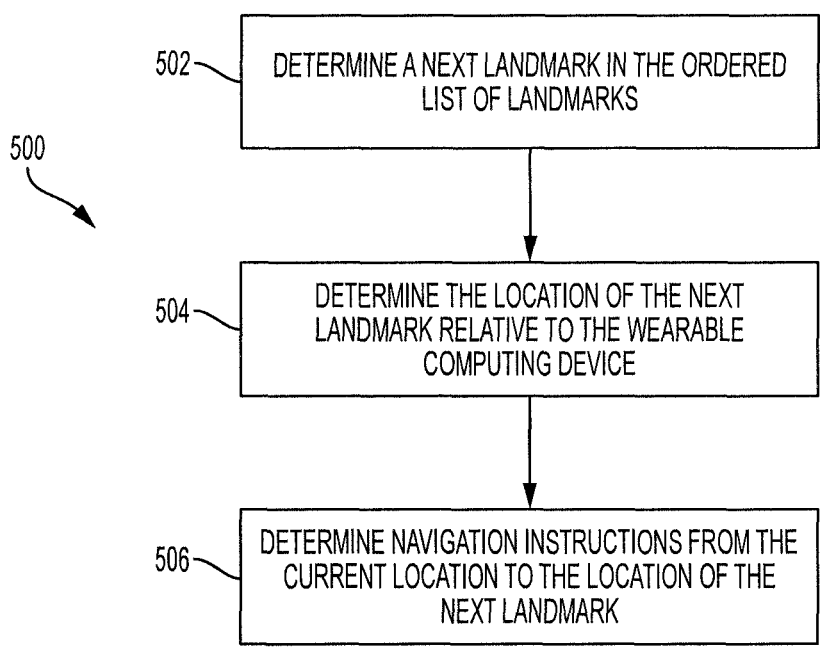
FIG. 5 is a flowchart illustrating a method for determining specific navigation instructions based on an ordered list of landmarks and currently detected data according to an embodiment of the present invention.

Turning now to FIG. 5, a method 500 for determining navigation instructions based on an ordered list of landmarks is shown. In block 502, the mobile processor 110 may determine a next landmark in the ordered list of landmarks. The mobile processor 110 may move sequentially through the landmarks from the starting location to the destination location. The next landmark corresponds to the landmark that is positioned after the current landmark in the ordered list.

For example, the ordered list may include a starting location, a landmark 1, a landmark 2, and a destination location. From the starting location, the next landmark is landmark 1. When the user arrives at landmark 1, the next landmark is landmark 2. When the user arrives at landmark 2, the next landmark is the destination location.

In block 504, the mobile processor 110 may determine the location of the next landmark relative to the current location of the wearable computing device 100. The mobile processor 110 may deteii line the location of the next landmark relative to the wearable computing device 100 in various manners. For example, the mobile processor 110 may determine the location of the next landmark by comparing current GPS coordinates of the wearable computing device 100 to GPS coordinates of the landmark. As another example, the database may include a location of the next landmark relative to a current landmark. If the wearable computing device 100 is at the current landmark, the location of the next landmark may be retrieved from the database. As yet another example, the database may include image data corresponding to the next landmark. The mobile processor 110 may analyze currently detected image data and compare the currently detected image data to the stored image data and determine the location of the next landmark relative to the wearable computing device 100 based on this comparison.

In block 506, the mobile processor 110 may determine navigation instructions from the current location to the location of the next landmark. The navigation instructions may include a direct path from the current location to the location of the next landmark. However, obstacles may be present between the current location and the location of the next landmark. The obstacles may include permanent obstacles (such as walls) or temporary obstacles (such as people or vehicles).

Furthermore, special instructions may be required to reach the next landmark from the current location. For example, a street may be present between the current location and the next landmark. Special instructions for the situation may include instructing a user to travel to a crosswalk, safely cross the road, and then continue towards the next landmark. The navigation instructions may account for such obstacles and may include such special instructions.

The method 500 may be repeated for each landmark between the starting location and the destination location.

Returning to FIG. 4, after at least some of the navigation instructions have been determined, the mobile processor 110 may cause an output device of the wearable computing device 100 to output the navigation instructions in block 414. The navigation instructions may include a direction and a distance to the next landmark, an image of the next landmark, an identifier of the next landmark, or the like, along with any special instructions as described above. For example, as the user reaches a landmark, the wearable computing device 100 may output audio data such as "now walk to the staircase" or "turn left and walk 10 feet to reach the next landmark." As another example, as the user reaches a landmark, the wearable computing device 100 may output image data corresponding to the next landmark. The user may then look for an object depicted in the image data, determine that the object corresponds to the next landmark, and walk towards the object.

In some embodiments, the user may be prompted to provide a ranking of the navigation route. The ranking may correspond to how desirable the navigation route is. After multiple routes are stored from a starting location to a destination location, rankings of the routes from multiple users may also be stored. Thus, when another user requests navigation instructions from the starting location to the destination location, the mobile processor may select the route having the best rankings.

In some embodiments, the rankings may include information such as an amount of time required to get from the starting location to the destination location, how scenic the route is, how crowded the route is, or the like. In that regard, a user that requests navigation instructions from the starting location to the destination location may select a route based on desired properties such as speed, scenery, or amount of crowd. After traversing the route, the user may provide his feedback regarding the different characteristics of the route.

Figure 6:
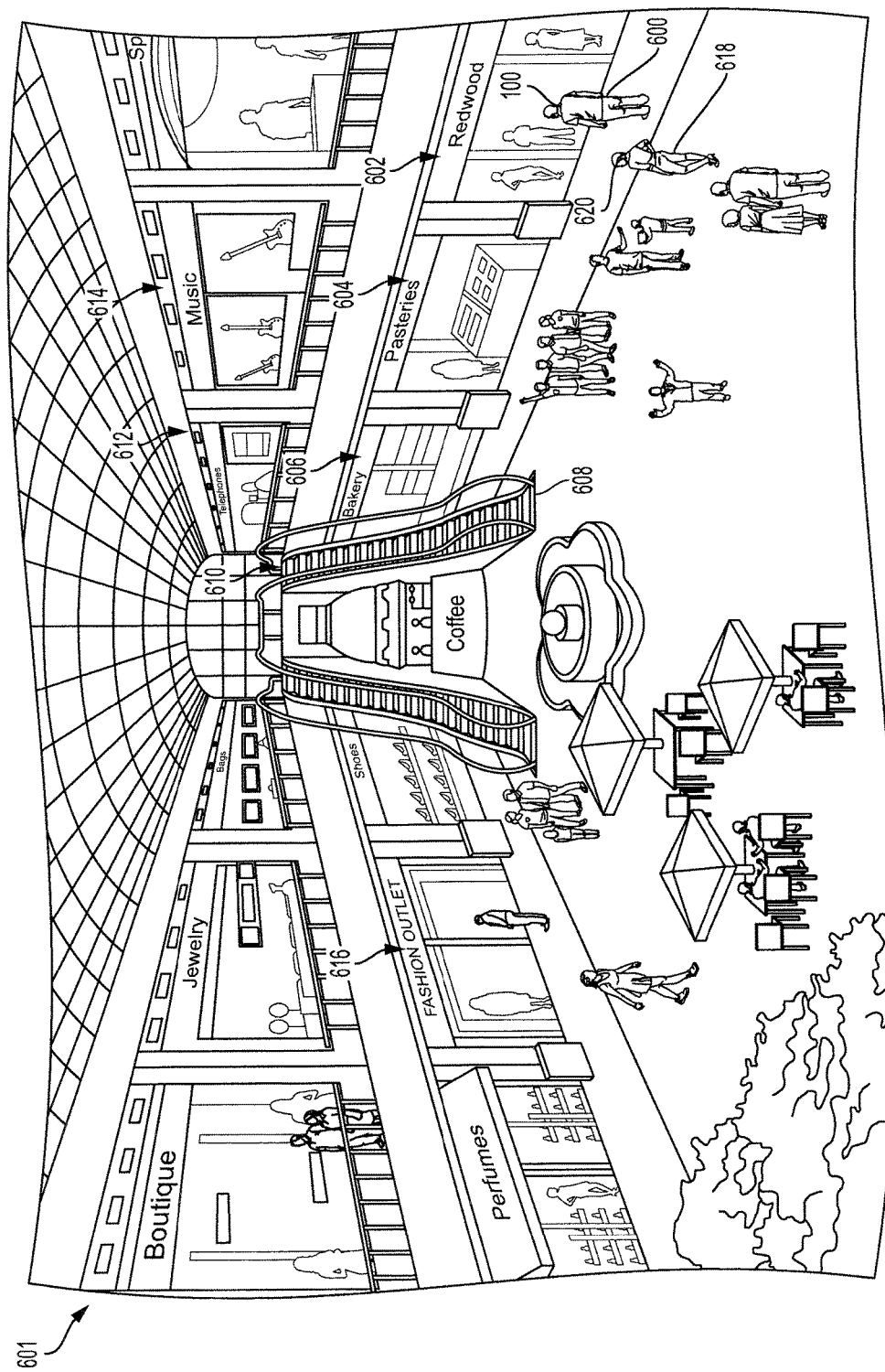
FIG. 6 is a drawing of an inside of a mall to illustrate an exemplary use of the methods of FIGS. 3, 4, and 5 according to an embodiment of the present invention.

Turning now to FIGS. 6 and 7, an exemplary use of the methods 300, 400, and 500 of FIGS. 3, 4, and 5, respectively, is shown. The example shown in FIGS. 6 and 7 may correspond to creating a database 700 and an ordered list 702, and using the database 700 and ordered list 702 for navigation instructions, within a mall 601.

In FIG. 6, a user 600 is wearing the wearable computing device 100. As the user 600 enters the mall, the user may indicate that she is entering the mall and the mobile processor 110 may store a currently detected location corresponding to the mall entrance. As the user begins to walk, she may pass a first store, "Redwood" 602. The user may say "I am now passing Redwood" 602. The mobile processor 110 may receive this input and may detect data corresponding to "Redwood" 602. The mobile processor 110 may also determine that "Redwood" 602 is 25 meters at 129 degrees from the mall entrance. The mobile processor 110 may store the identifier "Redwood" 602, any detected data, and the location 25 meters at 129 degrees from the mall entrance in the database 700.

At this point, the user 600 may provide input indicating that the user will be traveling from "Redwood" 602 to a store "music" 614. As such, the user may identify landmarks along the way and provide corresponding data to the wearable computing device. In particular, as the user is walking, she may say "I am now passing pastries" 604, "I am now getting on an up escalator entrance" 608, "I am now getting off of an up escalator exit" 610, "I am now passing telephones" 612, and "I have arrived at music" 614.

As the user identifies these landmarks, the mobile processor 110 may detect data corresponding to each landmark and determine locations of the landmarks relative to each other. The mobile processor 110 may then store this information in the database 700. The mobile processor 110 may also store the ordered list 702 of the landmarks.

The user 600 may continue to walk around the mall after reaching "music" 614. As the user walks, the user may notify the wearable computing device 100 of the other landmarks within the mall 601. In some embodiments, the mobile processor 110 may receive data corresponding to some locations and creates location markers based on the data. For example, as the user 600 walks by "fashion outlet" 616, the mobile processor 110 may identify the location marker as "fashion outlet" based on detected image data corresponding to the sign. The mobile processor 110 may then determine a location of "fashion outlet" 616 based on the image data or other detected data and store "fashion outlet" 616 as a location marker in the database 700.

After a period of time, a different user 618 may arrive at the mall 601 and go to "Redwood" 602. At this point, the user 618 may indicate to a mobile processor of a wearable computing device 620 that the user 618 wishes to travel from "Redwood" 602 to "telephones" 612. The mobile processor may determine that, because "telephones" 612 is in the ordered list 702 between "Redwood" 602 and "music" 614, the same ordered list 702 may be used to provide navigation instructions from "Redwood" 602 to "telephones" 612.

After determining that the ordered list 702 may be used to provide the desired navigation instructions, the mobile processor may determine that the next landmark in the ordered list 702 is "pastries" 604. The database 700 indicates that "pastries" 604 is 15 meters at 360 degrees from "Redwood" 602. The mobile processor may then cause an output device of the wearable computing device 622 to output data such as "continue to walk straight for 15 meters," or "walk to pastries" 604.

The mobile processor may continue in this way to provide navigation instructions between each of the landmarks until the user 618 has reached "telephones" 612.

As described above, the wearable computing device 100 of FIG. 1 may provide walking directions to products in a retail store. In addition to providing navigation instructions from a starting location to a product, a wearable computing device may also determine whether a particular retail location has desired products in stock.

Figure 8:
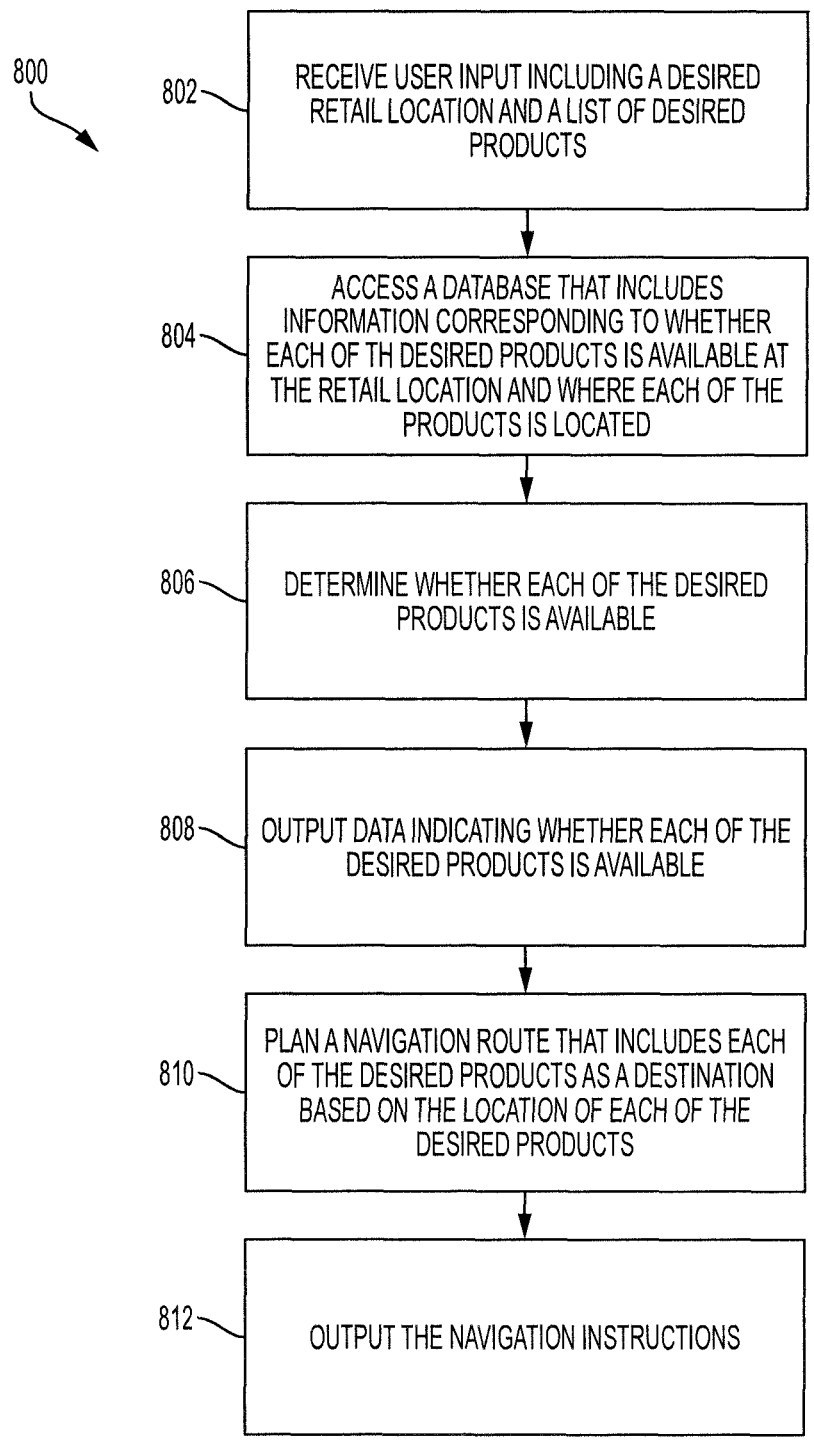
FIG. 8 is a flowchart illustrating a method for determining whether a particular retail location has desired products in stock and for providing navigation instructions to each of the desired products according to an embodiment of the present invention.

Turning now to FIG. 8, a method 800 is shown for determining whether a retail location has desired products in stock, and for providing navigation instructions to each desired product. The method 800 may be performed by components of a wearable computing device, such as the wearable computing device 100 of FIG. 1.

In block 802, the wearable computing device may receive user input including a desired retail location and a list of desired products. The user input may be received via any input device, such as a keyboard, a touchscreen, a microphone, or the like.

In block 804, the mobile processor may access a database that includes information corresponding to whether each of the desired products is available at the desired retail location. The database may also include a location of each desired product within the retail location. The database may be stored in a cloud and be accessible by multiple devices. In that regard, the database may be updated as each user travels through the retail location. In particular, if the detected data or user input indicates that a certain product is unavailable at the retail location, the mobile processor may update the database to reflect that the product is out of stock at that location.

In some embodiments, the database may be maintained by the retail location itself. For example, a grocery store may have an inventory tracking system that tracks whether each piece of inventory is available or not in stock. The inventory tracking system may include a database and be updated in response to a change in inventory, such as when new inventory arrives or when the last of a certain item is no longer in stock. The database may be connected to the cloud and accessed by multiple devices.

In block 806, the mobile processor may compare the received list of desired products to the database that was accessed in block 804 to determine whether each of the desired products is available at the retail location.

In block 808, the mobile processor may cause an output device of the wearable computing device to output data indicating whether each of the desired products is available. In some embodiments, the mobile processor may determine whether equivalent products are available when a desired product is unavailable. For example, the mobile processor may determine whether standard bananas are available if the user desires organic bananas and the organic bananas are unavailable. The mobile processor may also output data indicating which products are unavailable and whether equivalent products are available.

In some embodiments, if each of the desired products is not available at the desired retail location, the mobile processor may determine whether any other nearby retail location has each of the desired products in stock. If another retail location does have each of the desired products in stock, the wearable computing device may output data indicating that not all products are available. In some embodiments, the wearable computing device may output additional data indicating which products are unavailable.

If another retail location includes each of the desired products in stock, the wearable computing device may also output data indicating that the other retail location has each of the products and asking whether the user wishes to go to the other retail location instead of the desired retail location. If the user wishes to go to the other retail location, the mobile processor may again access the database of the other retail location to determine the location of each of the desired products within the other retail location.

In block 810, the mobile processor may plan the navigation route that includes each of the desired products as a destination location based on the location of each of the desired products. In order to plan the route, the mobile processor may analyze the location of each of the products to determine the shortest navigation route that reaches each of the desired products from the entrance of the retail location. In some embodiments, the mobile processor may also include a route from a current location of the wearable computing device to the entrance of the retail location.

The navigation route may be planned in a similar manner as that shown in FIG. 4 or may plan the navigation route using conventional navigation systems. In some embodiments, the navigation route may include specific details such as a particular aisle on which the product is located, a length from the entrance of the aisle to the product, a height of the product, and step-by-step directions to the product. In some embodiments, the navigation route may include less detail such as an aisle number in which the product is located.

In block 812, the mobile processor may control the output device to output the navigation instructions. The navigation instructions may be output in various manners. For example, as a user reaches a particular desired product, directions to the next desired product may be output. As another example, after the user reaches a desired product, the user may provide input requesting that directions to the next product be output. In some embodiments, the directions may be output on a display. In that regard, the directions may be output as a list including each product and its corresponding aisle number.

Figure 9:
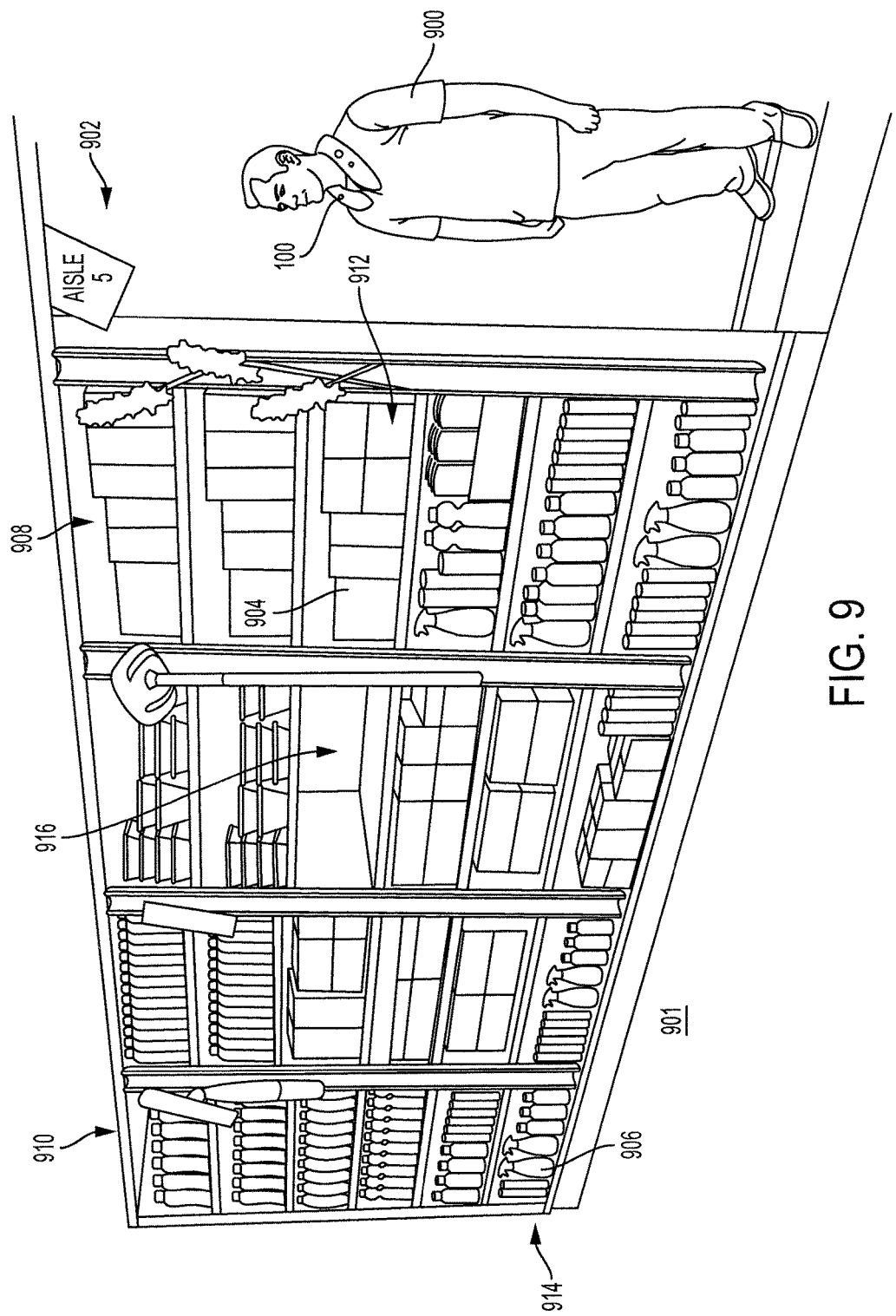
FIG. 9 is a drawing of an inside of a grocery store to illustrate an exemplary use of the method of FIG. 8 according to an embodiment of the present invention.

Turning now to FIG. 9, an exemplary use of the method 800 of FIG. 8 by the wearable computing device 100 is shown. In FIG. 9, a user 900 wearing the wearable computing device 100 is in a grocery store 901. The user 900 has previously requested a navigation route to multiple products within the grocery store 901. In particular, the user 900 has requested navigation instructions to sugar loops 904 and to glass cleaner 906.

The mobile processor of the wearable computing device 100 may have previously determined that the sugar loops 904 and the glass cleaner 906 are both on aisle 5 902. Thus, when the user enters the store, the wearable computing device 100 may provide walking instructions to the user to reach aisle 5 902 from the entrance to the grocery store 901.

The mobile processor may have also determined that the sugar loops 904 are on the first set of shelves 908 and that the glass cleaner 906 is on the fourth set of shelves 910. When the user 900 turns into aisle 5 902, the wearable computing device 100 may output data indicating that the sugar loops 904 are on the fourth shelf 912 from the bottom of the first set of shelves 908. In some embodiments, the wearable computing device 100 may output more specific data such as that the sugar loops 904 are positioned to the right of the user, 5 feet ahead, and at arm level.

In some embodiments, the wearable computing device 100 may detect image data corresponding to both the sugar loops 904 and a hand of the user 900. As the hand of the user 900 begins to approach the sugar loops 904 and enters the field of view of the camera, the mobile processor may output data specifying where the user 900 should move his hand to reach the sugar loops 904.

The mobile processor may have previously determined that glass cleaner 906 is on the fourth set of shelves 910 on the first shelf 914 from the bottom. After the user 900 obtains the sugar loops 904, the mobile processor may instruct the user 900 to travel towards the fourth set of shelves 910.

As the user 900 is walking, a camera of the wearable computing device 100 may detect an empty shelf 916. The mobile processor may either access the database or analyze image data to determine which product or products are typically on the empty shelf 916. The mobile processor may then update the database to reflect that the product that is typically stored on the empty shelf 916 is currently out of stock. In some embodiments, an electronic detector or reader or an employee of the grocery store 901 must verify that the product is out of stock before others may update such information in the database. This ensures that the product is actually out of stock prior to being marked out of stock in the database.

As the user 900 approaches the fourth set of shelves 910, the wearable computing device 100 may provide data to the user 900 indicating the location of the glass cleaner 906. This data may be provided in a similar manner as it was provided for the sugar loops 904.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A wearable computing device for creating a database usable for navigation comprising:
    an input device configured to receive input from the user;
    a global positioning system (GPS) sensor configured to detect a current location of the wearable computing device;
    an inertial measurement unit (IMU) configured to detect inertial measurement data of the wearable computing device;
    a camera configured to detect image data corresponding to an environment of the wearable computing device;
    a memory configured to store a database including a plurality of landmarks and corresponding locations; and
    a mobile processor coupled to the input device, the GPS sensor, the IMU, the camera, and the memory and configured to:
        receive first user input from the input device indicating that the user is traveling from a starting location to a destination location,
        receive second user input from the input device as the user is traveling indicating that new landmarks are present,
        determine locations of the new landmarks based on at least one of the current location of the wearable computing device, the inertial measurement data of the wearable computing device, or the detected image data corresponding to the environment of the wearable computing device,
        update the database to include the new landmarks and the locations of the new landmarks, and
        update the database to include an ordered list of landmarks including the new landmarks placed in order of their appearance from the starting location to the destination location such that the ordered list of landmarks corresponds to a route from the starting location to the destination location.

2. The wearable computing device of claim 1 further comprising an input/output port coupled to the mobile processor and configured to communicate with a remote server and wherein the database is stored in the remote server and is accessible by multiple computing devices.

3. The wearable computing device of claim 1 further comprising an output device coupled to the mobile processor and configured to output data, wherein the mobile processor is further configured to:
    receive third user input from the input device at a later time corresponding to a request for navigation instructions from the starting location to the destination location;
    determine the navigation instructions based on the ordered list of landmarks and at least one of the current location of the wearable computing device, the inertial measurement data of the wearable computing device, or the detected image data corresponding to the environment of the wearable computing device; and
    cause the output device to output the navigation instructions.

4. The wearable computing device of claim 3 wherein the mobile processor is further configured to:
    update the database to include the new landmarks by storing the detected image data associated with the new landmarks in the memory; and
    further determine the navigation instructions by determining a location of one of the new landmarks relative to the wearable computing device by comparing the detected image data to the stored image data and by determining a heading from the one of the new landmarks to a next landmark in the ordered list of landmarks.

5. The wearable computing device of claim 1 wherein the mobile processor is further configured to:
    periodically determine a location marker corresponding to a location or an image as the user is traveling from the starting location to the destination location;
    update the database to include the location marker; and
    update the ordered list of landmarks to include the location marker in its ordered location relative to the new landmarks from the starting location to the destination location.

6. The wearable computing device of claim I wherein:
    the memory is further configured to store product availability data corresponding to whether each of a plurality of products is available in a retail location;
    the destination location includes one of the plurality of products;
    the detected image data indicates that the one of the plurality of products is unavailable; and
    the mobile processor is further configured to update the product availability data to indicate that the one of the plurality of products is unavailable.

7. The wearable computing device of claim 1 further comprising an output device configured to output data and an input/output port coupled to the mobile processor and configured to communicate with a remote server that stores product availability data corresponding to whether each of a plurality of products is available in a retail location and wherein the mobile processor is further configured to:
    receive third user input including a desired retail location and a list of desired products;

communicate with the remote server via the input/output port to determine whether each of the desired products is available at the desired retail location; and cause the output device to output data indicating that each of the desired products is available at the desired retail location or output data indicating which of the desired products is not available at the desired retail location.

8. The wearable computing device of claim 1 wherein each of the plurality of landmarks includes at least one of a building, a plant, a tree, a sign, a road, a sidewalk, a light, a door, or a hallway.

9. A wearable computing device for providing navigation instructions to a user comprising:
an input device configured to receive input from the user;
an output device configured to output data;
a global positioning system (GPS) sensor configured to detect a current location of the wearable computing device;
an inertial measurement unit (IMU) configured to detect inertial measurement data of the wearable computing device;
a camera configured to detect image data corresponding to an environment of the wearable computing device;
a memory configured to store a database including a plurality of landmarks and corresponding locations; and
a mobile processor coupled to the input device, the output device, the GPS sensor, the IMU, the camera, and the memory and configured to:
receive first user input from the input device indicating that the user is traveling from a starting location to a destination location,
receive second user input from the input device as the user is traveling indicating that new landmarks are present,
determine locations of the new landmarks based on at least one of the current location of the wearable computing device, the inertial measurement data of the wearable computing device, or the detected image data corresponding to the environment of the wearable computing device,
update the database to include the new landmarks and the locations of the new landmarks,
update the database to include an ordered list of landmarks including the new landmarks placed in order of their appearance from the starting location to the destination location such that the ordered list of landmarks corresponds to a route from the starting location to the destination location,
receive third user input from the input device at a later time corresponding to a request for navigation instructions from the starting location to the destination location,
determine the navigation instructions based on the ordered list of landmarks, and cause the output device to output the navigation instructions.

10. The wearable computing device of claim 9 further comprising an input/output port coupled to the mobile processor and configured to communicate with a remote server and wherein the database is stored in the remote server and is accessible by multiple computing devices.

11. The wearable computing device of claim 9 wherein the mobile processor is further configured to:
further determine the navigation instructions based on at least one of the current location of the wearable computing device, the inertial measurement data of the wearable computing device, or the detected image data corresponding to the environment of the wearable computing device;
further update the database to include the new landmarks by storing the detected image data associated with the new landmarks in the memory; and
further determine the navigation instructions by determining a location of one of the new landmarks relative to the wearable computing device by comparing the detected image data to the stored image data and by determining a heading from the one of the new landmarks to a next landmark in the ordered list of landmarks.

12. The wearable computing device of claim 9 wherein the mobile processor is further configured to:
periodically determine a location marker corresponding to a location or an image as the user is traveling from the starting location to the destination location;
update the database to include the location marker; and
update the ordered list of landmarks to include the location marker in its ordered location relative to the new landmarks from the starting location to the destination location.

13. The wearable computing device of claim 9 wherein:
the memory is further configured to store product availability data corresponding to whether each of a plurality of products is available in a retail location;
the destination location includes one of the plurality of products;
the detected image data indicates that the one of the plurality of products is unavailable; and
the mobile processor is further configured to update the product availability data to indicate that the one of the plurality of products is unavailable.

14. The wearable computing device of claim 9 further comprising an input/output port coupled to the mobile processor and configured to communicate with a remote server that stores product availability data corresponding to whether each of a plurality of products is available in a retail location and wherein the mobile processor is further configured to:
receive fourth user input including a desired retail location and a list of desired products;
communicate with the remote server via the input/output port to determine whether each of the desired products is available at the desired retail location; and
cause the output device to output data indicating that each of the desired products is available at the desired retail location or output data indicating which of the desired products is not available at the desired retail location.

15. A method for creating a database usable for navigation by a wearable computing device comprising:
detecting, by a global positioning system (GPS) sensor, a current location of the wearable computing device;
detecting, by an inertial measurement unit (IMU), inertial measurement data of the wearable computing device;
detecting, by a camera, image data corresponding to an environment of the wearable computing device;
storing, in a memory, a database including a plurality of landmarks and corresponding locations;
receiving, via an input device, first user input indicating that the user is traveling from a starting location to a destination location;
receiving, via the input device, second user input indicating that new landmarks are present as the user is traveling from the starting location to the destination location;

determining, by a mobile processor, locations of the new landmarks based on at least one of the current location of the wearable computing device, the inertial measurement data of the wearable computing device, or the detected image data corresponding to the environment of the wearable computing device;

updating, by the mobile processor, the database to include the new landmarks and the locations of the new landmarks; and updating, by the mobile processor, the database to include an ordered list of landmarks including the new landmarks placed in order of their appearance from the starting location to the destination location such that the ordered list of landmarks corresponds to a route from the starting location to the destination location.

16. The method of claim 15 further comprising accessing, via an input/output port, the database, wherein the database is positioned on a remote server and is accessible by multiple computing devices.

17. The method of claim 15 further comprising:

receiving, via the input device, third user input corresponding to a request for navigation instructions from the starting location to the destination location; and determining, by the mobile processor, the navigation instructions based on the ordered list of landmarks and at least one of the current location of the wearable computing device, the inertial measurement data of the wearable computing device, or the detected image data corresponding to the environment of the wearable computing device; and outputting, by an output device, the navigation instructions.

18. The method of claim 17, wherein:

updating, by the mobile processor, the database to include the new landmarks further includes storing image data associated with the new landmarks in the memory; and determining, by the mobile processor, the navigation instructions further includes determining a location of one of the new landmarks relative to the wearable computing device by comparing the detected image data to the stored image data and by determining a heading from the one of the new landmarks to a next landmark in the ordered list of landmarks.

19. The method of claim 15 further comprising:

periodically deteiinining, by the mobile processor, a location marker corresponding to a location or an image as the user is traveling from the starting location to the destination location;

updating, by the mobile processor, the database to include the location marker; and updating, by the mobile processor, the ordered list of landmarks to include the location marker in its ordered location relative to the new landmarks from the starting location to the destination location.

20. The method of claim 15 further comprising:

receiving, via the input device, third user input including a desired retail location and a list of desired products;

accessing, via an input/output port, a remote server that stores product availability data corresponding to whether each of a plurality of products is available in a retail location to determine whether each of the desired products is available at the desired retail location; and outputting, by an output device, data indicating that each of the desired products is available at the desired retail location or data indicating which of the desired products is not available at the desired retail location.

* * * * *